(12) United States Patent
Faust et al.

(10) Patent No.: US 12,539,664 B2
(45) Date of Patent: Feb. 3, 2026

(54) THERMOSET INJECTION INTO FUSED FILAMENT FABRICATION PARTS WITH DISCONTINUOUS AND/OR CONTINUOUS REINFORCEMENT

(71) Applicant: MARKFORGED, INC., Waltham, MA (US)

(72) Inventors: Jessica Faust, Tyngsboro, MA (US); Joseph Roy-Mayhew, Watertown, MA (US); Peter Kelly, Boston, MA (US); Benjamin Hodsdon Gallup, Acton, MA (US); Jonathan Matthew Bond, Medfield, MA (US)

(73) Assignee: MARKFORGED, INC, Waltham, MA (US)

( * ) Notice: Subject to any disclaimer, the term of this patent is extended or adjusted under 35 U.S.C. 154(b) by 105 days.

(21) Appl. No.: 18/644,252

(22) Filed: Apr. 24, 2024

(65) Prior Publication Data

US 2024/0351276 A1    Oct. 24, 2024

Related U.S. Application Data

(60) Provisional application No. 63/461,425, filed on Apr. 24, 2023.

(51) Int. Cl.
*B29C 64/118* (2017.01)
*B29C 64/188* (2017.01)
*B29C 64/194* (2017.01)
*B29C 64/336* (2017.01)
*B33Y 10/00* (2015.01)
(Continued)

(52) U.S. Cl.
CPC .......... *B29C 64/118* (2017.08); *B29C 64/188* (2017.08); *B29C 64/194* (2017.08); *B29C 64/336* (2017.08); *B33Y 10/00* (2014.12); *B33Y 40/00* (2014.12); *B33Y 40/20* (2020.01); *B33Y 70/10* (2020.01); *B29K 2077/00* (2013.01); *B29K 2105/0094* (2013.01); *B29K 2105/08* (2013.01); *B29K 2105/16* (2013.01); *B29K 2307/04* (2013.01); *B29K 2995/0077* (2013.01); *B29L 2011/0058* (2013.01)

(58) Field of Classification Search
CPC .................................................... B29C 64/118
See application file for complete search history.

(56) References Cited

U.S. PATENT DOCUMENTS

| 5,901,593 A | 5/1999 | Fritz |
| 2018/0243981 A1 | 8/2018 | Manee et al. |

(Continued)

FOREIGN PATENT DOCUMENTS

EP    3656535 A1    5/2020

OTHER PUBLICATIONS

Extended European Search Report from corresponding European Application No. 24172232.1 dated Sep. 19, 2024.

*Primary Examiner* — Atul P. Khare
(74) *Attorney, Agent, or Firm* — PEARL COHEN ZEDEK LATZER BARATZ LLP

(57) ABSTRACT

Methods of infiltrating a three-dimensional part with a resin are disclosed. The methods include designing a part to be printed, the part having at least one inlet and an infill pattern. The methods include using three-dimensional printing to print the designed part. The methods further include infiltrating the printed part using a resin delivered to an interior of the part via the at least one inlet to surround the infill pattern with the resin. The methods additionally include allowing the infiltrated resin to cure.

20 Claims, 25 Drawing Sheets

(51) Int. Cl.
B33Y 40/00 (2020.01)
B33Y 40/20 (2020.01)
B33Y 70/10 (2020.01)
*B29K 77/00* (2006.01)
*B29K 105/00* (2006.01)
*B29K 105/08* (2006.01)
*B29K 105/16* (2006.01)
*B29K 307/04* (2006.01)
*B29L 11/00* (2006.01)

(56) References Cited

U.S. PATENT DOCUMENTS

2018/0311891 A1  11/2018  Duty et al.
2019/0091927 A1   3/2019  Kunc et al.
2021/0206157 A1   7/2021  Nielsen-Cole et al.

Print orientation

Infiltration orientation

Triangular/hexagonal infill

Offset infill

Variable bead width infill

Notched needle to catch fiber

Fiber hooks into notch

# THERMOSET INJECTION INTO FUSED FILAMENT FABRICATION PARTS WITH DISCONTINUOUS AND/OR CONTINUOUS REINFORCEMENT

CROSS-REFERENCE TO RELATED APPLICATIONS

This application claims priority under 35 U.S.C. § 119 (e) to U.S. Provisional Application Ser. No. 63/461,425, titled "Thermoset Injection into Fused Filament Fabrication Parts with Discontinuous and/or Continuous Reinforcement" filed Apr. 24, 2023, which is incorporated herein by reference in its entirety for all purposes.

FIELD OF TECHNOLOGY

Aspects and embodiments disclosed herein relate to systems and methods for manufacturing a part with resins injected into the 3D printed parts.

SUMMARY

In accordance with an aspect, there is provided a method of infiltrating a three-dimensional part with a resin. The method may include designing a part to be printed. The part to be printed may have at least one inlet and an infill pattern. The method may include using three-dimensional printing to print the designed part. The method further may include infiltrating the printed part using a resin delivered to an interior of the part via the at least one inlet to surround the infill pattern with the resin. The method additionally may include allowing the infiltrated resin to cure.

In further embodiments, the method may include pausing the printing of the part prior to infiltrating with the resin.

In further embodiments, the method may include inserting one or more Z-direction reinforcement layers into the part. The one or more Z-direction reinforcement layers may be a filament or fiber. For example, the filament or fiber may include one or more of raw carbon fiber, carbon fiber impregnated with a thermoset resin, carbon fiber impregnated with a thermoplastic matrix, aramid fibers, and fibers impregnated with a polymer.

In further embodiments, the method may include resuming the printing of the part following insertion of the one or more Z-direction reinforcement layers.

In some embodiments, the resin may be a thermoset resin or a thermoplastic resin. In certain embodiments, the thermoset resin may be one or more of epoxies, phenolic resins, UV curing resins, polyesters, vinylesters, polyamide resins, bismaleimide resins, rubbers, and mixtures thereof. In other embodiments, the thermoplastic resin may be one or more of acrylonitrile butadiene styrene (ABS), acrylic, high density polyethylene (HDPE), polypropylene, polyethylene, polystyrene, polyvinylchloride (PVC), styrene, polycarbonate, nylon, acetal, and poly (tetrafluoroethylene) (PTFE).

In some embodiments, the resin has a viscosity between about 1,500 cP to 15,000 cP, e.g., about 1,500 cP, about 2,000 cP, about 2,500 cP, about 3,000 cP, about 3,500 cP, about 4,000 cP, about 4,500 cP, about 5,000 cP, about 5,500 cP, about 6,000 cP, about 6,500 cP, about 7,000 cP, about 7,500 cP, about 8,000 cP, about 8,500 cP, about 9,000 cP, about 9,500 cP, about 10,000 cP, about 10,500 cP, about 11,000 cP, about 11,500 cP, about 12,000 cP, about 12,500 cP, about 13,000 cP, about 13,500 cP, about 14,000 cP, about 14,500 cP, or about 15,000 cP, during infiltration.

In some embodiments, the resin may be neat. In some embodiments, the resin may include one or more additives. For example, the one or more additives may include carbon fibers, glass, ceramics, metals, minerals, or mixtures thereof. The one or more additives may be in any suitable form, such as rods, fibers, cones, tubes, platelets, spheres, or mixtures thereof.

In some embodiments, the resin may provide for a part that has less than 0.2% linear shrinkage in a linear dimension upon curing of the resin.

In some embodiments, the infill pattern may be one or more of triangular infill, hexagonal infill, a rectangular infill, and a gyroid infill. In further embodiments, the infill pattern may include one or more surface patterning features along a Z-direction of the part, e.g., to increase surface area of the infill. The surface patterning features of the infill pattern may be one or more of undulating surfaces, triangular patterns, hexagonal patterns, offset infill patterns, or variable width channels.

In some embodiments, the infiltrating of the part with resin may occur on a multi-axis print bed with five degrees of freedom, e.g., X-, Y-, and Z-axes and the X-Z and Y-Z planes.

In accordance with an aspect, there is provided a method of infiltrating a three-dimensional part with a resin. The method may include using three-dimensional printing to print a designed part having reinforcement in an X-Y plane. The method may include printing continuous reinforcement in a Z-direction across one or more layers of the part. The method further may include printing a final layer including at least one inlet and at least one outlet. The method may include infiltrating the printed part using a resin delivered to an interior of the part via the at least one inlet to surround the reinforcement in the X-Y plane and the continuous reinforcement in the Z-direction with the resin. The method additionally may include allowing the infiltrated resin to cure.

BRIEF DESCRIPTION OF THE DRAWINGS

The accompanying drawings are not drawn to scale. In the drawings, each identical or nearly identical component that is illustrated in the various figures is represented by a like numeral. For purposes of clarity, not every component may be labeled in every drawing. In the drawings:

FIG. 4A illustrates an FFF part with angled paths. FIG. 4B illustrates an FFF part with a large internal volume;

FIG. 6A illustrates an example setup used to infiltrate the resin into the part. FIG. 6B illustrates the plurality of outlet ports aiding with infiltration;

FIG. 17A illustrates the component of the printer. FIG. 17B illustrates use of the printer of FIG. 17A;

FIG. 18A illustrates a cross-section of the part showing open cell gyroid infill. FIG. 18B illustrates a cross-section of the part showing open cell rectangular infill;

FIG. 19A illustrates the placement of the reinforcing fibers. FIG. 19B illustrate the fracturing of the mounting plate following infiltration with a resin;

FIG. 20A illustrates various resin fill levels in the part. FIG. 20B illustrates the installation of a reinforcement fiber into the part prior to resin infiltration;

FIG. 21A illustrates the location along the Z-axis where the test parts failed. FIG. 21B illustrates a cross-section of one test part showing thermoset resin and reinforcing fibers;

DETAILED DESCRIPTION

Figure 1:
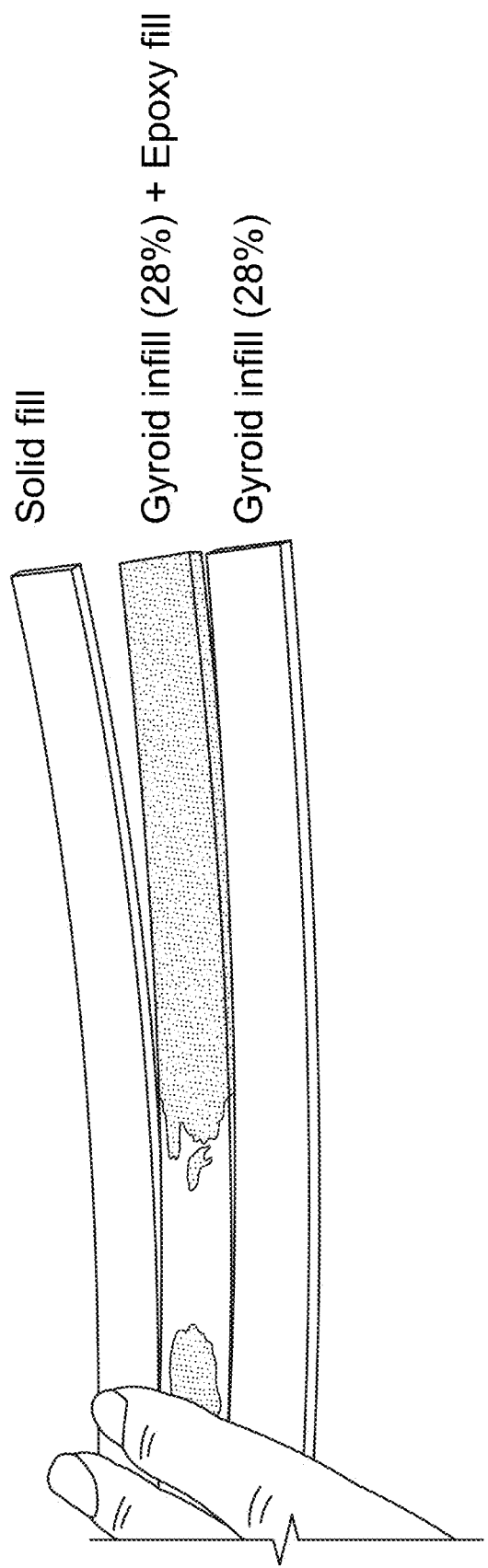
FIG. 1 illustrates a comparison of warping in different printed FFF parts. Each part was printed with two layers of continuous fiber on the bottom of the part to induce warp. The rest of the part was solid fill (top), gyroid infill at 28% with epoxy resin infiltration (middle), or gyroid infill at 28%.

This disclosure is directed to novel processes, devices using said novel processes, and compositions of matter formed as a direct result of said novel processes. In some aspects, this disclosure is directed to a platform technology that is the combination of three-dimensional printers, control platforms for fused filament fabrication (FFF), composite materials, and methods of injecting a resin, e.g., a thermoset resin, into the interior of a part formed using FFF.

In an embodiment, the general process includes the following steps:
1) designing a part to be printed using computer aided design (CAD) or similar design platform;
2) slicing the digital representation of the part to prepare for FFF printing;
3) using the sliced digital representation of the part to print the part using FFF; and
4) injecting a resin into the interior of the printed part and allowing the resin to cure.

In further embodiments, the general process may include one or more of the following optional steps:
5) pausing the print;
6) inserting a reinforcement layer through the Z-direction of the part; or
7) continuing the print with the reinforced Z-direction.

FFF printing, especially prints forming fiber reinforced composite parts, can exhibit anisotropic properties and suffer from poor Z-direction strength. Additionally, FFF parts can be limited in functionality when using only extruded or deposited thermoplastic polymers. The disclosed apparatus and methods are robust and versatile techniques to infiltrate a part formed with FFF with a resin that can afford a greater degree of design flexibility to the FFF process. It is an object of this disclosure to develop a method for producing 3D printed composite parts having improved z-strength.

In general, 3D printed composite parts are reinforced in the X-Y plane via the continuous fiber printing process but typically not in the Z-direction. In the present disclosure, parts formed using FFF can also be reinforced in the Z-direction by inserting continuous fiber or other reinforcement into open channels or an infill cell formed within the part prior to sealing the interior of the part, e.g., printing the part roof or floor. Following this insertion step, the part can be infiltrated with a resin, e.g., a thermoset resin, to bond the continuous Z-direction reinforcement, e.g., a reinforcing fiber, with the thermoplastic FFF part.

The process disclosed herein offers tunability in the design and fabrication of parts made using FFF. For example, the FFF part can be fully infiltrated or partially infiltrated in select areas with resin to tune physical properties such as density. Further, a neat, i.e., unfilled, or filled resin can be infiltrated into areas of the FFF part that require different mechanical properties, including, but not limited to, greater stiffness, greater impact resistance, greater thermal or electrical conductivity, or greater flame retardancy. In some embodiments, processes and system of this disclosure can be utilized to form parts useful with adjusted properties, including but not limited to, improved mechanical properties, e.g., specifically in the Z-axis, thermal and electrical conductivity, lower or reduced warping, i.e., more isotropic coefficient of thermal expansion (CTE), magnetic properties, density, environmental stability, aesthetics, heat transfer, and faster production time.

Thermoset-based FFF printing is of interest, as seen in academic studies, as a way to improve interlayer adhesion and thermal stability of printed parts. However, challenges with part shrinkage and resulting part dimensional accuracy have thus prevented thermoset-based FFF printing from becoming widely adopted.

The present inventors have determined that using a thermoplastic FFF skeleton, i.e., a part printed using a thermoplastic material, can avoid interlayer delamination and part shrinkage. A resin, e.g., thermoset resin, is infiltrated into the FFF part and confined within the thermoplastic shell, therefore dimensional accuracy issues are avoided while still taking advantage of the thermal stability and isotropic mechanical properties of resins, e.g., thermoset resins. As of this disclosure, there is currently no known available system or process that can offer FFF printed parts infiltrated with a resin, e.g., thermoset resin, to create a final part. The disclosed systems and processes provide substantial design flexibility for the user depending on the selected resin, e.g., thermoset resin, and area of the part that is to be infiltrated with the resin, e.g., thermoset resin. Continuous fiber filament printing technologies allow for continuous fiber reinforcement in the X-Y plane of the part, which can then be infiltrated with a resin, e.g., thermoset resin.

Further, the resin-infused FFF parts can be reinforced in the Z-axis with continuous fiber to improve Z-direction strength. Z-direction oriented fibers are typically not used in traditional composite molding techniques that rely on layering fiber fabrics in a mold to create the final part. The present disclosure provides for reinforcing FFF parts in the Z-direction with continuous fiber filaments. In addition to reinforcing FFF parts in the Z-direction, resin-infused FFF parts can be made without fiber reinforcement, made with fiber reinforcement in the X-Y plane, or made with fiber reinforcement in both the XY plane and along the Z-axis.

As disclosed herein, FFF parts can be infiltrated with a neat or filled resin to gain additional functionality. Resin chemistry can be modulated to adjust properties including, but not limited to, thermal conductivity, electrical conductivity, thermal stability, and viscosity. In addition to resins, e.g., thermoset resins, phase change materials may also be injected into an FFF part for a specific application, e.g., producing heat exchangers. As disclosed herein, FFF parts can be infiltrated with a resin, e.g., thermoset resin, in specific user-selected areas by changing the internal geometry of the infill pattern within the shell of the FFF part. In this configuration, this can preserve the low internal density of the FFF parts while offering the functionality of resin infusion. Partial resin infiltration is presently not possible with other part production methods, including injection molding and composite vacuum-assisted resin infusion.

One challenge with using resins, e.g., thermoset resins, is the reactions used in setting the resin are exothermic and generate a substantial amount of heat. Some thermoset resins experience rapid exothermic reactions during a large volume cure, thus limiting their use for creating larger parts, which are typically made in stages to avoid resin overheating. In contrast, a FFF part infiltrated with a resin, e.g., thermoset resins, can prevent thermal runaway from occurring in exothermic thermoset reactions. The infill of an FFF printed part that is infiltrated with resin reduces this reaction by creating a physical barrier between neighboring curing regions. The physical separation between curing regions can allow for the production of larger parts in one step that otherwise could not be made with the thermoset alone.

As disclosed herein, system and methods used to form FFF parts infiltrated with a resin, e.g., a thermoset resin, can reduce warping and shrinkage for solid fill parts. FFF parts are typically printed in a layer-by-layer fashion and therefore introduce anisotropic coefficient of thermal expansion (CTE) behaviors, especially for discontinuous and continuous reinforced parts. As a result of this anisotropy in CTE, solid filled FFF parts often show a high warping behavior as seen in FIG. 1. This warping can be avoided by using resin, e.g., thermoset resin, infiltration to create the solid part as it does not suffer from anisotropic CTE. As further illustrated in FIG. 1, a part made by filling a FFF part having 28% gyroid infill with an epoxy resin resulted in a part that was significantly less warped than the solid filled FFF part.

As disclosed herein, a method for infiltrating a part with a resin, e.g., a thermoset resin, generally includes designing and printing a part using only a polymer filament or with continuous fiber reinforcement in the X-Y plane.

If continuous reinforcement is desired, the print is paused prior to printing the roof and continuous fiber reinforcement is added into the desired areas such that it spans one or more layers of the part. Following reinforcement of the part, the part can be finalized by the printing of a final layer that closes the interior of the part, e.g., a roof or ceiling layer.

To infiltrate the printed part with a resin, e.g., a thermoset resin, an inlet and outlet can be positioned on the exterior of the part for the resin to flow through the part. A resin delivery device, e.g., a syringe or the like, including the resin in a suitable chamber, is positioned at the inlet and resin is pushed through the part while air escapes through the outlet. The resin can be pre-mixed ahead of the delivery, e.g., an epoxy having a pre-mixed resin and hardener. Alternatively, the components of the resin can be mixed during infiltration into the part inlet. Following infiltration, the resin is cured following its curing cycle, thereby providing a resin-infiltrated FFF part.

Figure 2:
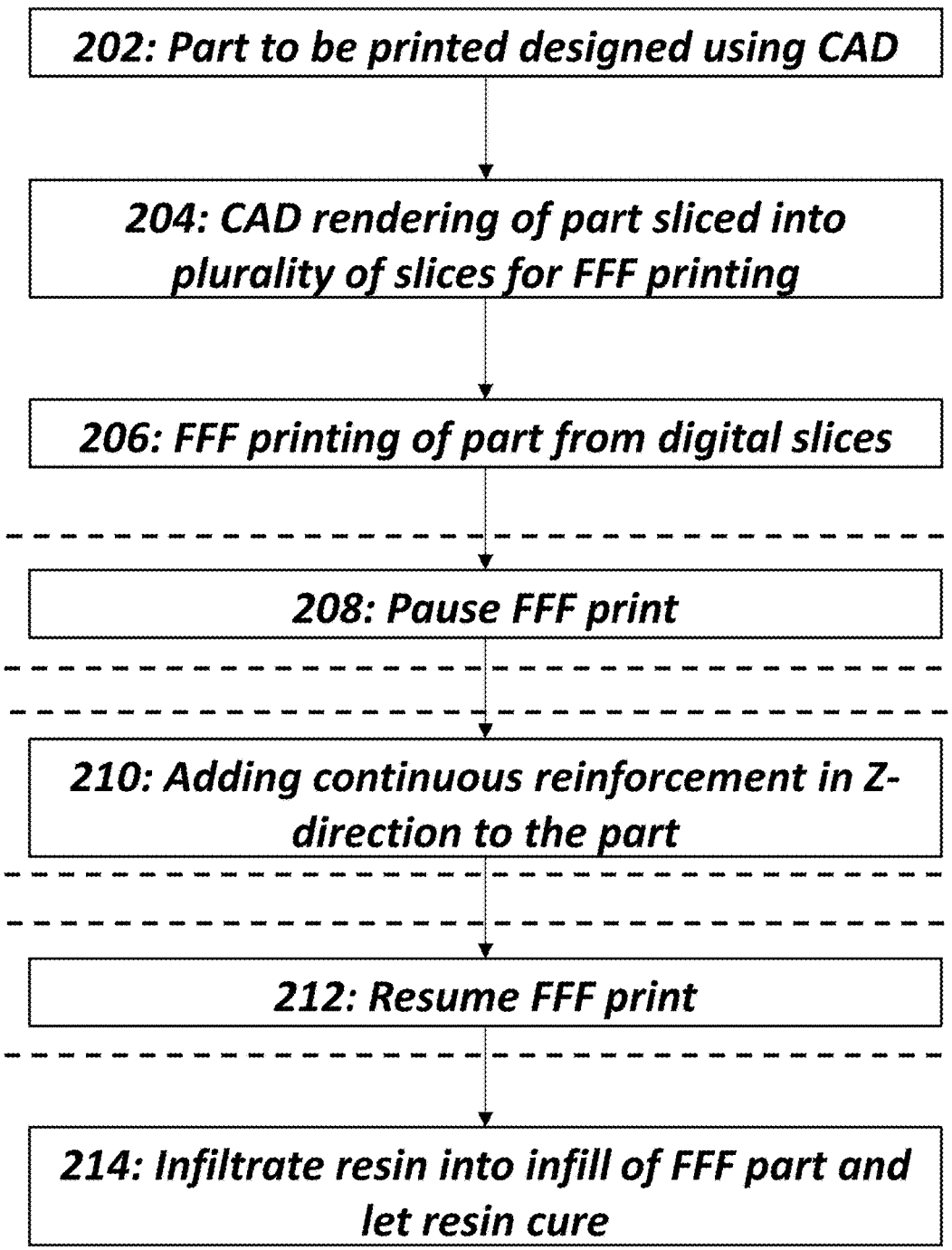
FIG. 2 illustrates a method for designing, printing, and infiltrating a FFF part with a resin, in accordance with certain embodiments.
Figure 3:
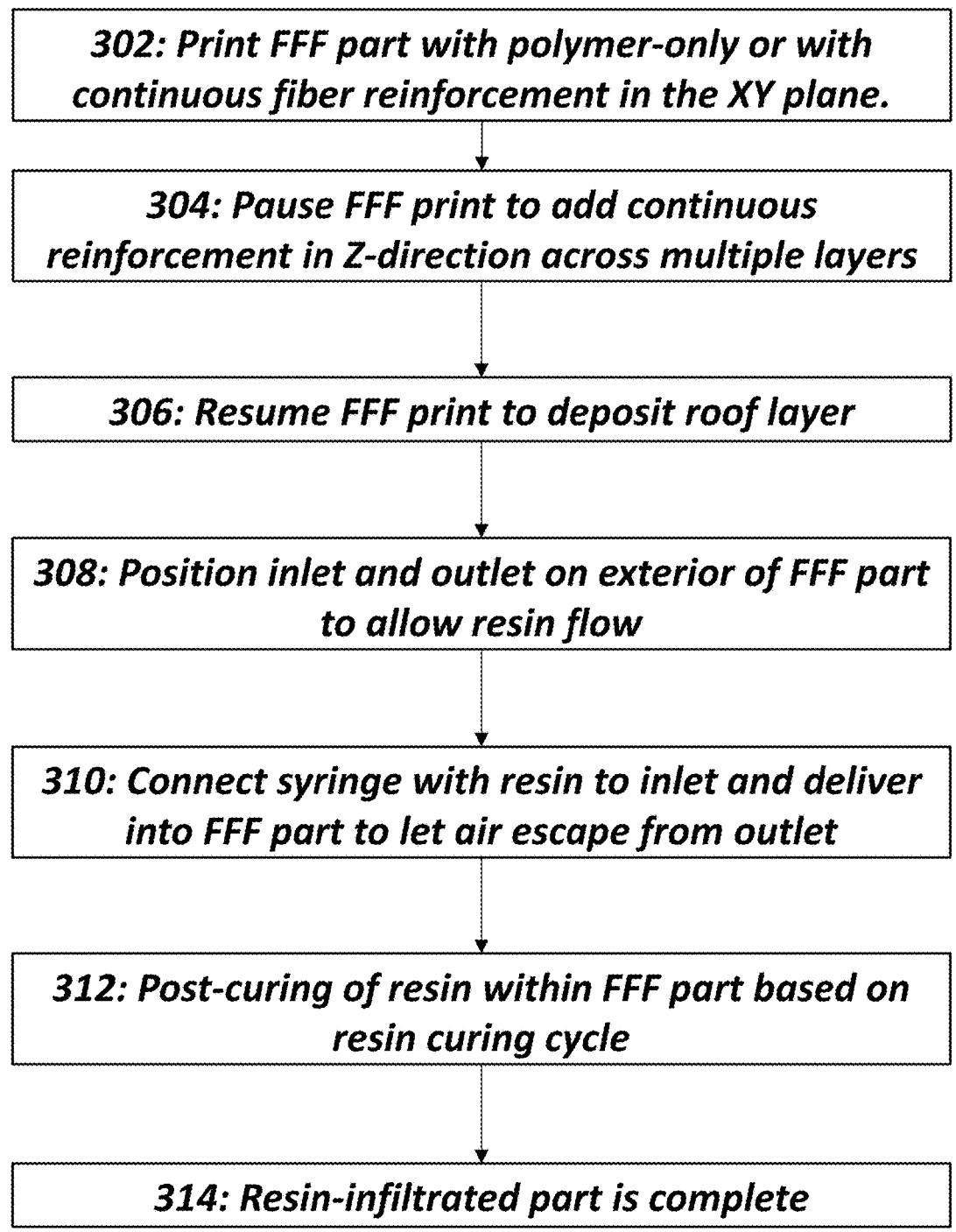
FIG. 3 illustrates a method for printing an FFF part with continuous reinforcement along the Z-direction and infiltrating the reinforced part with a resin, in accordance with certain embodiments.

FIGS. 2 and 3 illustrate methods of infiltrating parts printed using FFF that are filled with a resin, e.g., a thermoset resin, during or following printing of the part. With respect to FIG. 2, method 200 includes designing a part to be printed using CAD or another similar tool for creating a digital representation of the part to be printed at step 202. The CAD rendering or digital representation of the part is digitally sliced into a plurality of slices for FFF printing in step 204. At step 206, the plurality of digital slices are used to operate a 3D printer to begin printing the part based on the slice geometries. Steps 208, 210, and 212 are optional steps in this method as indicated by the dashed line boxes and would be chosen by an end user or operator if reinforcement in the Z-direction of the part is desired. At optional step 208, the FFF printing is paused, leaving exposed the infill of the FFF part. Reinforcement in the Z-direction, such as by the incorporation of continuous fibers into channels printed in the infill, is added at optional step 210. Once a sufficient or desired amount of reinforcement in the Z-direction has been added to the part, FFF printing resumes at step 212. Once the printing is complete or near completion, a resin may be infiltrated into the part and left to cure at step 214.

With respect to FIG. 3, method 300 includes printing a part using FFF with a polymer-only filament or with continuous fiber reinforcement in the XY plane at step 302. The FFF printing is paused, leaving exposed the infill of the FFF part where continuous reinforcement in Z-direction across multiple layers is added to the part at step 304. Once a sufficient or desired amount of reinforcement in the Z-direction has been added to the part, FFF printing resumes at step 306 to deposit a roof layer or layer that otherwise seals the infill of the FFF part. Once the printing is complete or near completion, an inlet and outlet, e.g., at least one inlet and at least one outlet, are positioned on the exterior of the FFF part to permit resin to flow into the infill of the FFF part at step 308. To start resin flow, a syringe is connected to the inlet of the FFF part and actuated to deliver the resin while permitting air within the FFF part to be displaced via the outlet at step 310. Once the FFF part has been infiltrated with the resin, the resin is post-cured according to the curing cycle of the specific resin at step 312. Once the resin cures, the resin-infiltrated part is complete at step 314.

Resins suitable for use in the present disclosure include thermoset resins or thermoplastic resins. Examples of thermoset resins include, but are not limited to, epoxies, phenolic resins, UV curing resins, polyesters, vinylesters, polyamide resins, bismaleimide resins, rubbers, and mixtures thereof. Examples of thermoplastic resins include, but are not limited to, acrylonitrile butadiene styrene (ABS), acrylic, high density polyethylene, polypropylene, polyethylene, polystyrene, polyvinylchloride (PVC), styrene, polycarbonate, nylon, acetal, and poly (tetrafluoroethylene), among others. In general, the resin chosen for infiltration into the FFF parts should not experience significant shrinkage post-cure, e.g., less than 0.2% linear shrinkage in a given dimension of the FFF part. Further, the resin should be chosen such that the resin has a chemistry that is compatible with the material of the FFF part to provide for chemical bonding or mechanical interlocking resulting in material load transfer.

As disclosed herein, the resin used to infiltrate the FFF part can be a neat resin, i.e., a resin with no additives, or can be filled with one or more filler materials, i.e., a discontinuous filler, to adjust the final properties of the resin. In some embodiments, suitable filler materials include, but are not limited to, carbon fibers, glass, ceramics, e.g., alumina, boron nitride, metals, e.g., stainless steel, e.g., 17-4 stainless steel, copper, nickel, minerals, e.g., mica, graphite, or mixtures thereof. The geometry of the filler particles may be any suitable shape, including, but not limited to, rods, fibers, cones, tubes, platelets, spheres, or mixtures thereof. The size of the filler particles may be from the micron scale to the nanometer scale. One of skill in the art would recognize the relationships between particle type, particle size, particle shape, and the expected resultant properties of the cured resin and thus be able to choose the appropriate particle type, particle size, and particle shape to achieve the desired properties.

As disclosed herein, the resin is infiltrated into the part and thus has a viscosity sufficient to permit controlled delivery without leakage from the part, i.e., viscosity too low. In the same way, the viscosity of the resin cannot be sufficiently great that the resin either cannot be infiltrated into the part or cannot flow within the part to reach the desired areas. In some embodiments, the resin has a viscosity between about 500 cP to about 50,000 cP, e.g., about 500 cP, about 600 cP, about 700 cP, about 800 cP, about 900 cP, about 1,000 cP, about 1,500 cP, about 2,000 cP, about 2,500 cP, about 3,000 cP, about 3,500 cP, about 4,000 cP, about 4,500 cP, about 5,000 cP, about 5,500 cP, about 6,000 cP, about 6,500 cP, about 7,000 cP, about 7,500 cP, about 8,000 cP, about 8,500 cP, about 9,000 cP, about 9,500 cP, about 10,000 cP, about 10,500 cP, about 11,000 cP, about 11,500 cP, about 12,000 cP, about 12,500 cP, about 13,000 cP, about 13,500 cP, about 14,000 cP, about 14,500 cP, about 15,000 cP, about 15,500 cP, about 16,000 cP, about 16,500 cP, about 17,000 cP, about 17,500 cP, about 18,000 cP, about 18,500 cP, about 19,000 cP, about 19,500 cP, about 20,000 cP, about 20,500 cP, about 21,000 cP, about 21,500 cP, about 22,000 cP, about 22,500 cP, about 23,000 cP, about 23,500 cP, about 24,000 cP, about 24,500 cP, about 25,000 cP, about 25,500 cP, about 26,000 cP, about 26,500 cP, about 27,000 cP, about 27,500 cP, about 28,000 cP, about 28,500 cP, about 29,000 cP, about 29,500 cP, about 30,000 cP, about 30,500 cP, about 31,000 cP, about 31,500 cP, about 32,000 cP, about 32,500 cP, about 33,000 cP, about 33,500 cP, about 34,000 cP, about 34,500 cP, about 35,000 cP, about 35,500 cP, about 36,000 cP, about 36,500 cP, about 37,000 cP, about 37,500 cP, about 38,000 cP, about 38,500 cP, about 39,000 cP, about 39,500 cP, about 40,000 cP, about 40,500 cP, about 41,000 cP, about 41,500 cP, about 42,000 cP, about 42,500 cP, about 43,000 cP, about 43,500 cP, about 44,000 cP, about 44,500 cP, about 45,000 cP, about 45,500 cP, about 46,000 cP, about 46,500 cP, about 47,000 cP, about 47,500 cP, about 48,000 cP, about 48,500 cP, about 49,000 cP, about 49,500 cP, or about 50,000 cP. In certain embodiments, the resin has a viscosity between about 1,500 cP to 15,000 cP during infiltration, e.g., about 1,500 cP, about 2,000 cP, about 2,500 cP, about 3,000 cP, about 3,500 cP, about 4,000 cP, about 4,500 cP, about 5,000 cP, about 5,500 cP, about 6,000 cP, about 6,500 cP, about 7,000 cP, about 7,500 cP, about 8,000 cP, about 8,500 cP, about 9,000 cP, about 9,500 cP, about 10,000 cP, about 10,500 cP, about 11,000 cP, about 11,500 cP, about 12,000 cP, about 12,500 cP, about 13,000 cP, about 13,500 cP, about 14,000 cP, about 14,500 cP, or about 15,000 cP during infiltration.

As disclosed herein, FFF parts can be infiltrated with a resin by way of an inlet and outlet printed as part of the final part. Thus, the FFF part can be infiltrated with resin following completion of the printing process. An example of this type of infiltration is illustrated in FIGS. 4A-4B, which shows a colored resin being infiltrated in FFF printed parts where an inlet and outlet has been formed into the top surface of the part during the printing process.

Figure 4A:
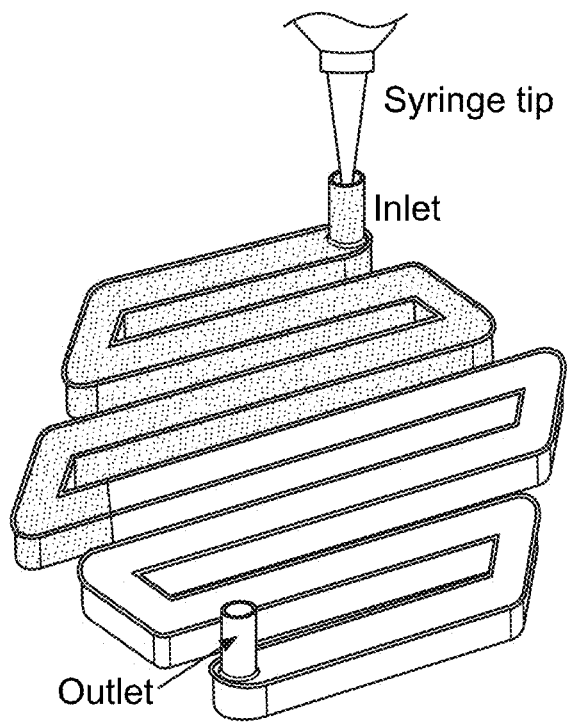
FIGS. 4A-4B illustrate the infiltration of a resin into FFF parts having an inlet and outlet positioned on the top surface of the part.
Figure 4B:
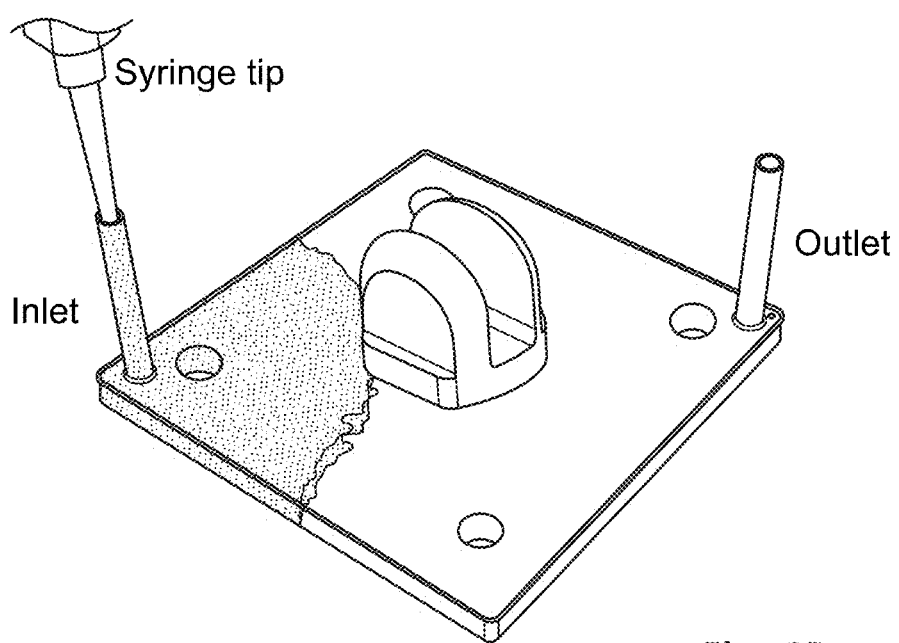

As shown in FIGS. 4A-4B, the inlet is connectable to the tip of a syringe containing the resin to be infiltrated. The resin is then directed from the syringe into the part, displacing air within the part that escapes through the outlet. The resin can infiltrate the entire interior of the part, such as with an open-cell infill, e.g., gyroid or rectangular with alternating raster angles each layer, or only partially infiltrate the part if the open-cell infill does not extend through entire part or the part has custom designed interior channels, e.g., creation of electrically conductive pathways.

The inlet and outlet of the part need not be on the top surface of the part but can be located in any suitable or practical location of the part. The location of the inlet and outlets, and the decision to infiltrate the part right-side up or up-side down depends on the geometry of the part and the areas that a user wants to infiltrate with resin. In some embodiments, the inlet and outlet can be located on the bottom or underside of the part. An example of a part having a bottom position inlet and outlet is illustrated in FIGS. 5A-5B.

Figure 5A:
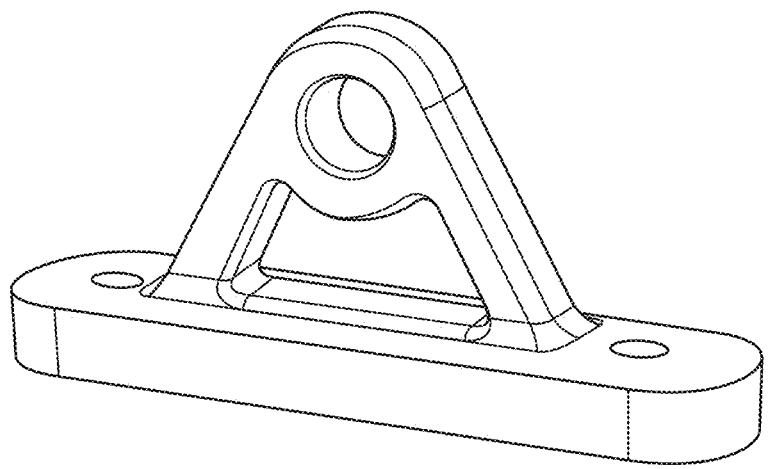
FIGS. 5A-5B illustrate a part with a tall protrusion in the print orientation (FIG. 5A) and inverted while secured for infiltration (FIG. 5B)
Figure 5B:
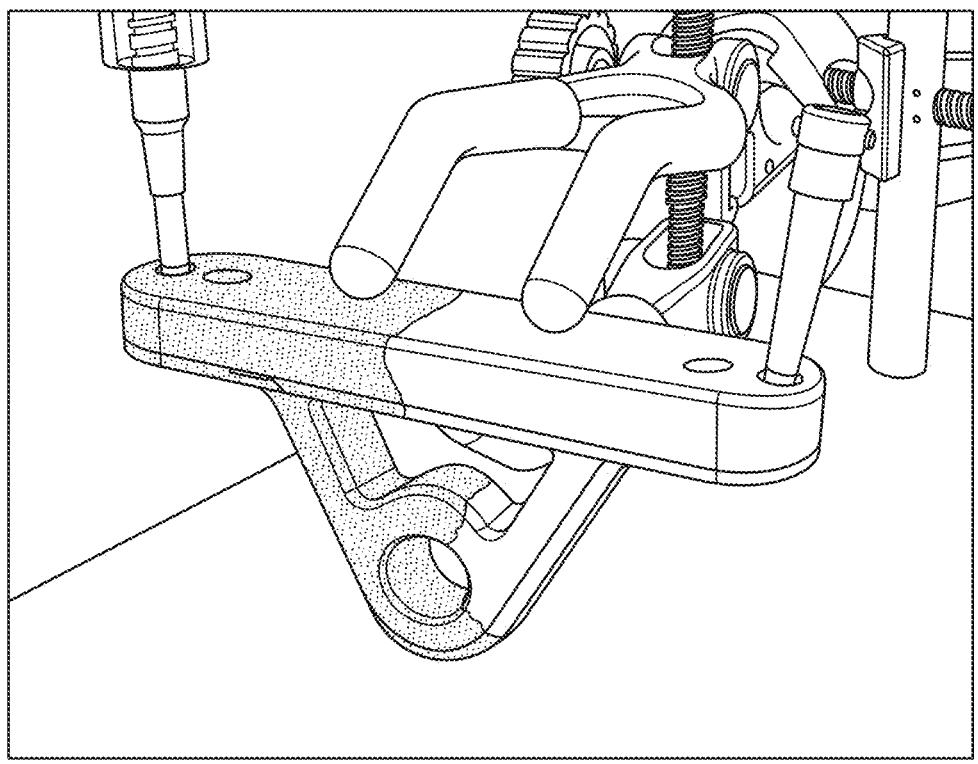

As seen in FIGS. 5A-5B, the part includes inlet and outlet holes on the bottom to permit infiltrating with resin. The inlet and outlet holes on the bottom can be added during the design stage for the part, by the addition of a raft to the bottom of the part, or by the holes being added post-printing, i.e., by a user. Parts having infiltration inlets and outlets on the bottom of the part may be suitable for parts with taller sections where gravity assisted infiltration can be used to ensure resin flows through the taller sections. For parts having bottom inlets and outlets, the part can be positioned and secured in an inverted position using any suitable mechanism. For example, the part can be secured in place using clamps as illustrated in FIG. 5B, a custom-shaped mold, a foam support, e.g., memory foam, a bed of sand or pellets that conform to the shape of the part, or vertical pins that conform to the shape of the part. These examples are exemplary, and other support mechanisms are envisioned by this disclosure.

Figure 6A:
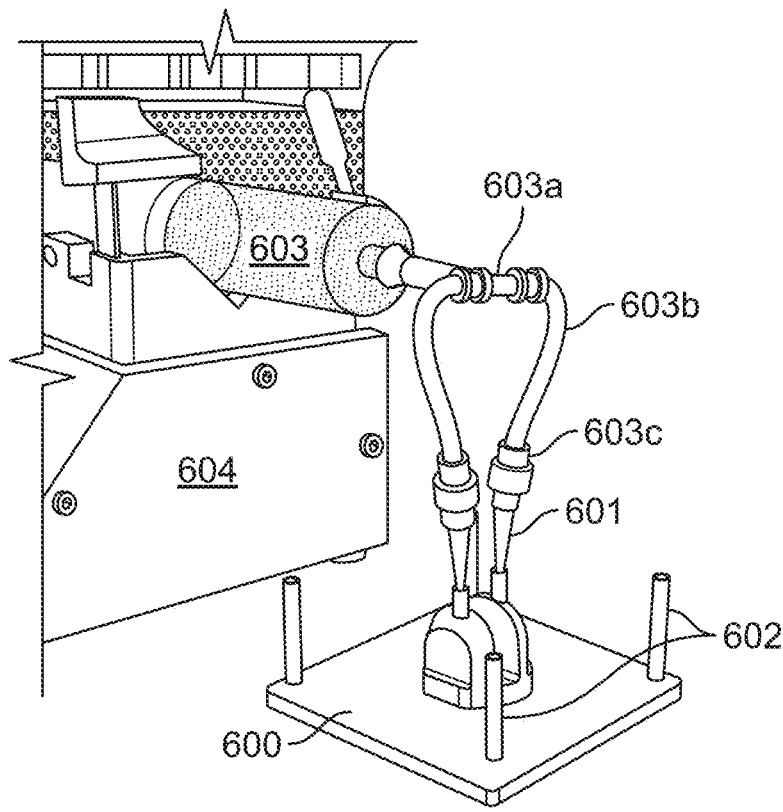
FIGS. 6A-6B illustrate a part having a plurality of inlet and outlet ports.
Figure 6B:
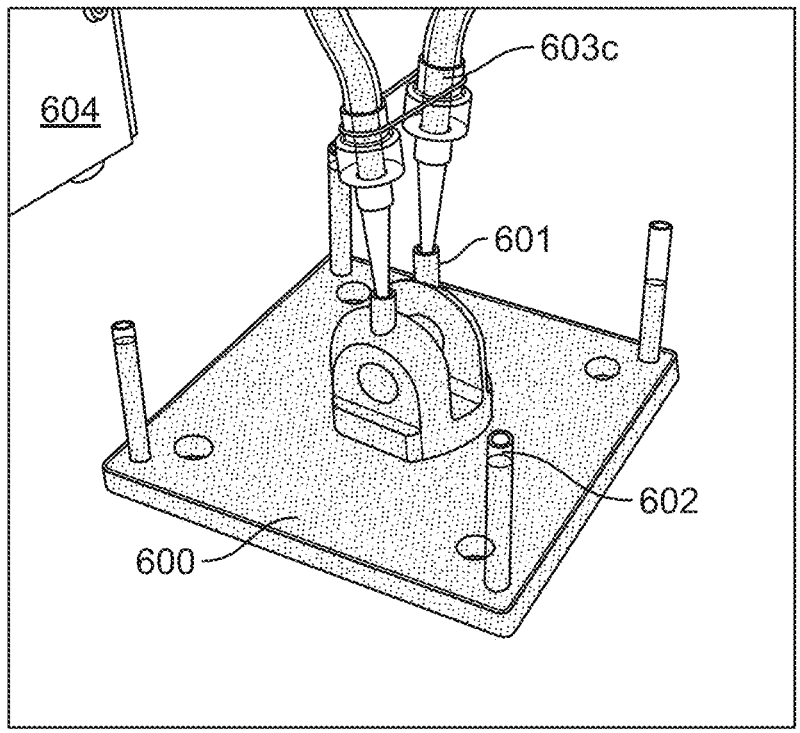

The part to be infiltrated can have a plurality of inlet ports and outlet ports to facilitate infiltration with resin. The use of multiple inlet and outlet ports in a part can aid in complete infiltration of the part with resin. The number of inlet ports and outlet ports on a part may be identical, e.g., two inlet ports and two outlet ports. Alternatively, the number of inlet ports and outlet ports can be different, i.e., the number of inlet ports can be greater than or less than the number of outlet ports. An example of a part with a plurality of inlet ports and outlet ports is illustrated in FIGS. 6A-6B. The part 600 illustrated in FIGS. 6A-6B has two inlets 601 that are fed by a syringe 603 containing a colored resin and appropriate connectors 603a, 603b, a syringe pump 604, and four outlets 602 at the corners of the part 600. The inlets 601 may be supported by alignment braces 603c to reduce resin leakage. In this configuration, the air within the part 600 can more effectively escape the interior of the part 600 from the increased number of outlets 602, permitting the resin to infiltrate out to the corner outlets 602 of the part 600.

As disclosed herein, the resin can also be infiltrated into the part while the part is being produced or printed. In this embodiment, the resin can be infiltrated into the part during a pause in the production process, e.g., using a syringe affixed with a needle. Infiltrating during a printing or production process may be advantageous for infiltrating closed-cell infill channels or parts that include channels designed without an inlet or an outlet on the exterior of the part.

Figure 7:
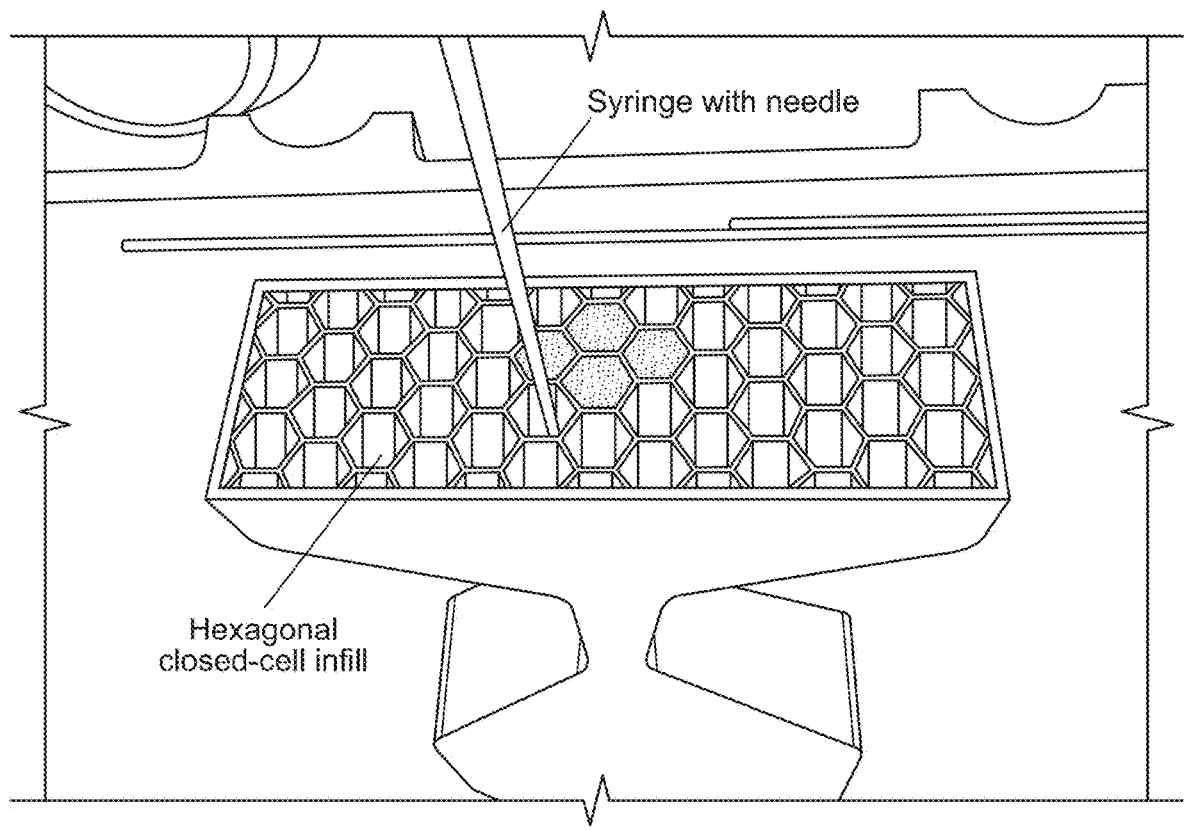
FIG. 7 illustrates part having closed-cell hexagonal infill being infiltrated with a resin prior to the printing of the top layer.

An example of a part being infiltrated during a printing process is illustrated in FIG. 7. In FIG. 7, the part is printed with hexagonal closed cell fill. Before the next layer is deposited, a syringe with a needle is directed into individual hexagonal cells of the part to fill the cell with resin. Once the appropriate number of cells are filled with resin, the printing of the top layer of the part, i.e., the roof, resumes to close the hexagonal cells. The part can be filled at any point in the printing or production process. For example, the filling of the part may occur at the end of the printing before the final layer is deposited as in FIG. 7. Alternatively, the filling of the part may occur at one or more stages in the printing or production process. For example, the printing or production process may be paused after a certain number of layers is deposited, e.g., the printing or production process is paused, and resin injected into the part at layers 100, 200, 300, etc., to allow for infiltration in stages. The manner of infiltrating with resin during a printing or production process will in part determine the length of the resin deposition components, e.g., syringe and needle. A length of a needle of the syringe is a function of the build volume and/or the length of the needle and the expected height of the part. For staged printing at predetermined layer counts in a part, the length of the needle can be shorter. In contrast, for infiltration near the end of a printing process, the length of the needle can be longer to provide for infiltration of the complete part. In any embodiment disclosed herein, the deposition components, e.g., syringe and needle, can be used to infiltrate at ambient temperature or heated. The use of heat on the syringe is determined by the resin being infiltrated and is generally used to decrease the viscosity of the resin to facilitate infiltration, e.g., using thermoplastic resins.

Figure 8:
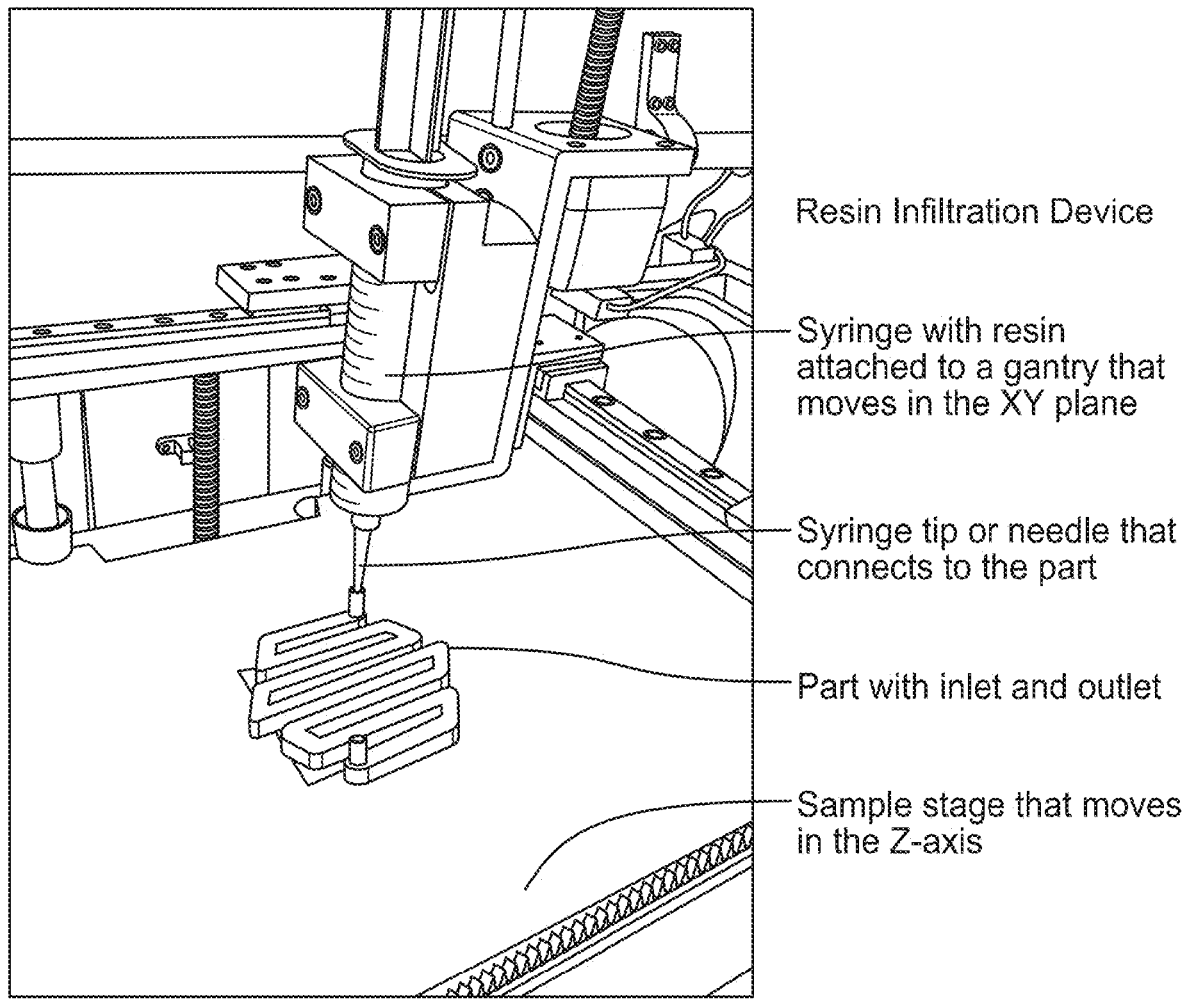
FIG. 8 illustrates a system for the automated printing of FFF parts and subsequent infiltration of the printed parts with a resin, in accordance with certain embodiments.

In some embodiments, the infiltration process, e.g., finding the inlet, positioning the syringe nozzle and infiltrating the part, is configured to be substantially automated such that minimal intervention from an end user or operator is needed. When automated, the infiltration process can be integrated into the control system of the three-dimensional printer that is printing the part or can be performed using a standalone control system that is integrated into the infiltration components, e.g., a controllable syringe pump and resin reservoir. An example of this automation is illustrated in FIG. 8. As seen in FIG. 8, the printed part can be positioned onto a sample stage that can move in the Z-direction, i.e., up and down, to bring the printed part into contact with the resin infiltration device, shown as a syringe filled with resin attached to a syringe pump. The syringe and associated pump are attached to an XY gantry that moves the syringe in the XY plane such that the syringe tip can be placed directly onto the inlet of part to permit resin infiltration.

As disclosed herein, the part to be printed with FFF should be designed such that it will not leak resin during the printing, infiltration, and/or curing steps. For example, a part can be printed using methods known to produce leak resistant parts, such as fish scale printing or interleaved printing. In general, the internal geometry of a part can be open cell infill, combination of open and closed cell infill, a combination of low density and high-density regions created via custom infill, or a solid fill part with interior channels designed to allow resin to flow. In some embodiments, the entirety of the part may be an open cell infill, e.g., gyroid fill or rectangular fill with alternating paths. In other embodiments, a portion of the part may be an open cell infill and a separate portion of the part may have a closed cell infill. In further embodiments, the entirety of the part may be a closed cell infill. For parts that have vertical channels as part of their design, the vertical channels can be printed in a solid fill part where Z-direction reinforcement is desired. These vertical channels can be filled with resin during an infiltration step to provide Z-direction reinforcement.

Figure 9:
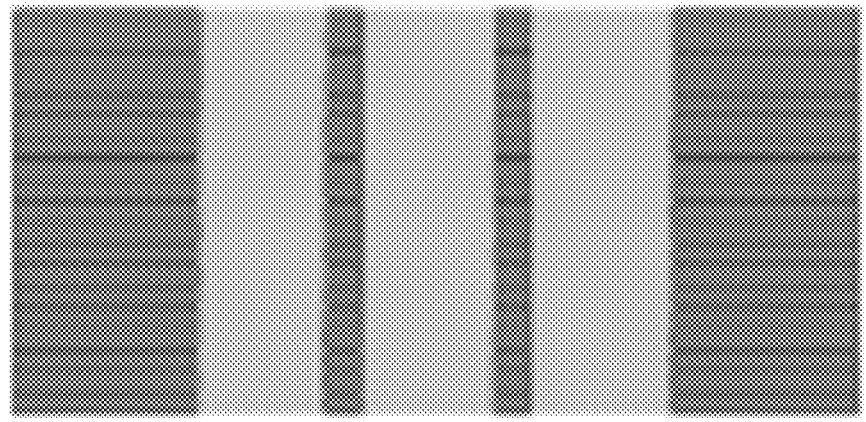
FIG. 9 illustrates different patterns of infill for improving adhesion between the filaments of a part and the infiltrated resin, in accordance with certain embodiments.
Figure 9:
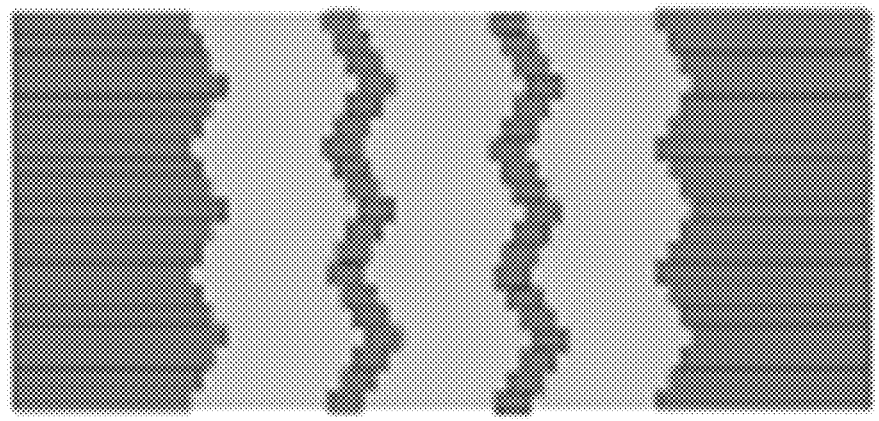
Figure 9:
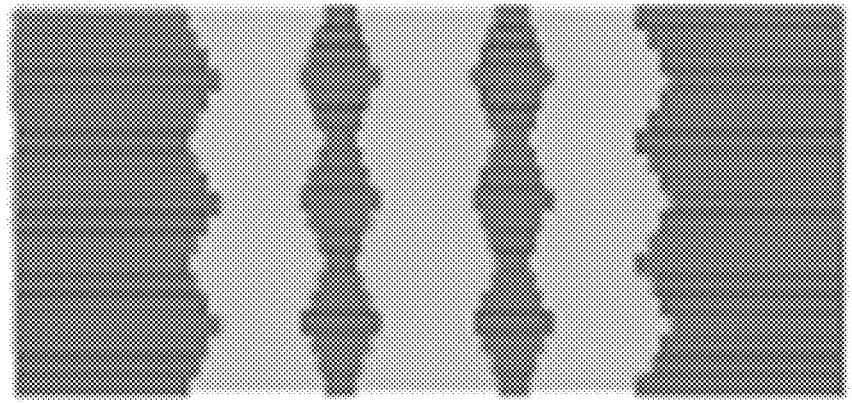

In some embodiments, the walls of the vertical channel can include one or more structural features to aid in Z-direction reinforcement. Resins may have poor chemical compatibility with the FFF part and thus can delaminate when the part is under applied mechanical load. Reductions in delamination can be achieved by using alternating infill wall patterns to create surfaces to promote mechanical interlocking with the resin. For example, the walls of the vertical channels can be patterned to create increased surface area to promote mechanical interlocking with the resin. An example of surface patterning to improve resin adhesion is illustrated in FIG. 9. As shown in FIG. 9, the fill patterns of the infill can include one or more of undulating surfaces, triangular patterns, hexagonal patterns, offset infill patterns, or variable width channels to increase the surface area of the printed material such that the resin has more infill to chemically bond to. In some embodiments, the walls of the vertical channels can be printed at angle, i.e., offset from the 0° vertical angle of the Z-axis, to allow a reinforcing fiber to be inserted into the channel without getting stuck or jammed. In further embodiments, the walls of the vertical channels can have no discernable structural changes, e.g., smooth walls or surfaces.

Figure 10:
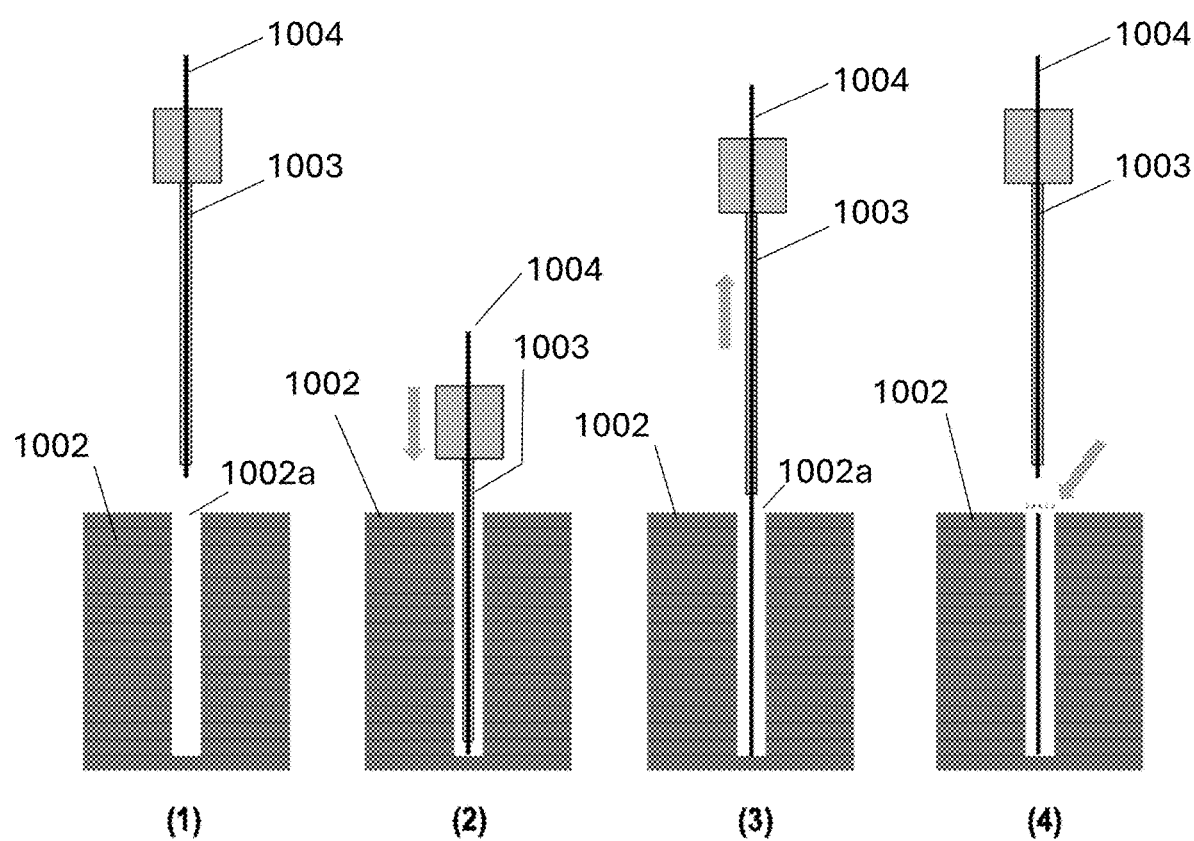
FIG. 10 illustrates a method of inserting a fiber into a channel of a part, in accordance with certain embodiments. Step (1) includes positioning of fiber within a lumen above the channel in the part. Step (2) includes insertion of lumen and fiber into the channel of part. Step (3) includes removal of the lumen, leaving the fiber in the channel of the part. Step (4) includes cutting the fiber flush with the top of the part.

As disclosed herein, the part to be infiltrated may include reinforcement along the Z-direction to improve the mechanical properties or strength of the part. The reinforcement may include the infiltration of resin into all or a portion of the part, the addition of a continuous reinforcing fiber, e.g., carbon fiber, into the part along the Z-direction, or both. As used herein, a "fiber" may refer to an un-impregnated tow of fibers, impregnated tow of fibers, e.g., tow impregnated with a thermoset or thermoplastic polymer matrix, a single fiber, or combination of multiple materials in a fiber or rod-like geometry. The channel the fiber is placed into is to be infiltrated with resin to connect the fiber to the surrounding FFF part and provide sufficient load transfer and mechanical reinforcement. When continuous reinforcing fibers are added to a part, the continuous reinforcing fibers can be added during the printing process prior to a final printing step to close off or otherwise seal the part. For parts that include both the addition of a continuous reinforcing fiber and infiltration with a resin, the continuous reinforcing fiber is generally added to the part prior to the infiltration of resin. As disclosed herein, the infiltration of parts, e.g., fiber-containing parts, can occur close to the end of the printing or production of the part or at one or more stages during the printing or production of the part. For example, a fiber that has been impregnated with a polymer, such as a thermoplastic or thermoset resin, can be extruded and cut to a specific length such that it drops into an open, empty channel within the part in a free-fall motion. Once the fiber is appropriately placed, the printing or production of the part is resumed and the channel is infiltrated in a later step. Alternatively, a fiber can be extruded from within a lumen, e.g., a needle, and cut flush after positioning in the appropriate channel within the part. An example of this is illustrated in FIG. 10. As illustrated in FIG. 10, a reinforcing fiber 1004 can be placed within a lumen 1003, such as syringe needle, and directed into a vertical channel 1002*a* of a part 1002. Once the reinforcing fiber 1004 and lumen 1003 are positioned in the vertical channel 1002*a*, the lumen 1003 can be withdrawn, leaving the reinforcing fiber 1004 within the vertical channel 1002*a*. The reinforcing fiber 1004 can then be cut such that the end of the fiber 1004 is approximately or substantially flush with the top surface of the part 1002. In this configuration, jams of the fiber 1004, e.g., becoming stuck against the sides of the vertical channel 1002*a*, are mitigated as the lumen 1003 prevents the fiber 1004 from buckling during insertion into the vertical channel 1002*a*. Alternatively, the chosen reinforcing fiber 1004 can be a larger diameter, i.e., a larger bend radius, such that it has greater rigidity and a larger bending radius which can prevent buckling during insertion into the channel. In further embodiments, a reinforcing fiber can be extruded through a lumen that co-extrudes a resin to fill the vertical channel as the reinforcing fiber is positioned. The reinforcing fiber can then be cut once the vertical channel is filled with resin to set the reinforcing fiber. The illustration of channels and fibers having substantially circular cross-sections is only an embodiment and the channels printed within the parts and the fibers themselves can have any suitable cross-sectional shape, e.g., circular, oval, triangular, rectangular, or shaped to match the geometry of the infill or channel in the FFF part.

Figure 11:
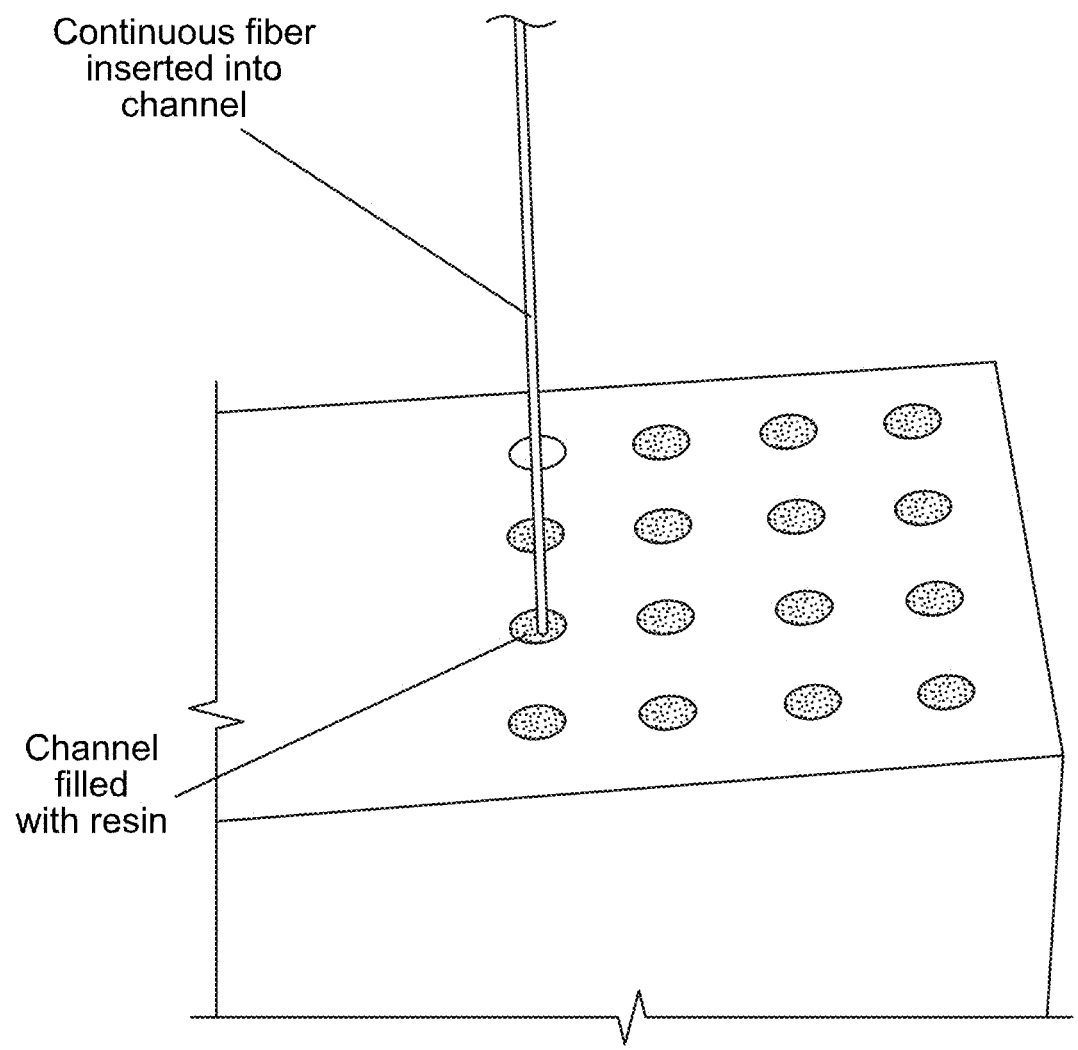
FIG. 11 illustrates the insertion of a continuous fiber into a channel of a part that is pre-filled with a resin.

In some embodiments, a reinforcing fiber can be placed into a vertical channel that is already partially filled with resin, with the partial fill to account for volume taken up by the fiber once it is inserted into the vertical channel. An example of the insertion of a reinforcing fiber being placed into a vertical channel that is already partially filled with resin is illustrated in FIG. 11. In FIG. 11, a continuous fiber is inserted into a vertical channel that is partially filled with resin. The vertical channel is filled with sufficient resin that the continuous fiber can be positioned but not filled to the point that the volume of the continuous fiber causes excess resin to leak from the top of the vertical channel and coat the top of the part. To insert the continuous fiber into the vertical channel, the continuous fiber can be pushed into an open channel using a push rod or other solid core device. Once the continuous fiber is in the open channel, the channel can be infiltrated with a resin as disclosed herein. The illustration of channels and fibers having substantially circular cross-sections in FIG. 11 is only an embodiment and the channels printed within the parts and the fibers themselves can have any suitable cross-sectional shape, e.g., circular, oval, triangular, rectangular, or shaped to match the geometry of the infill or channel in the FFF part.

Figure 12A:
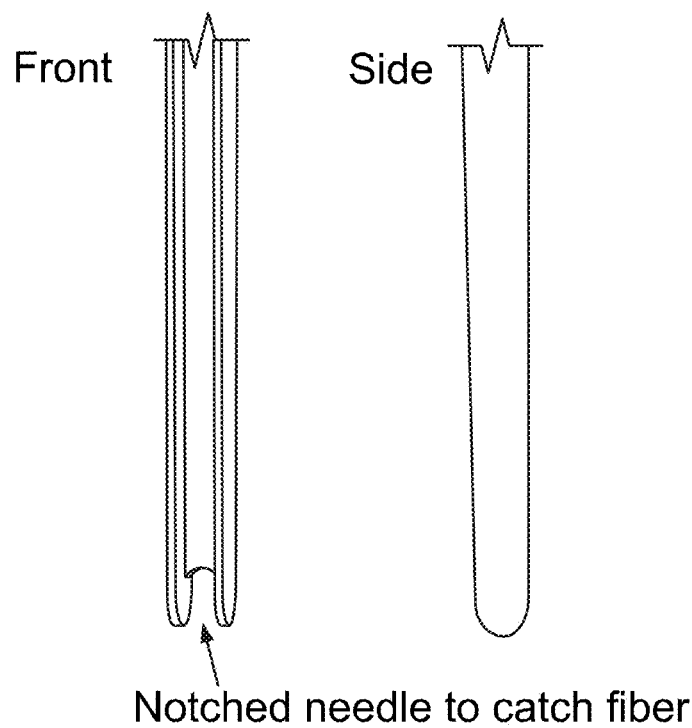
FIG. 12A-12B illustrate front and side images of a needle having a tip with a notch at a terminal end (FIG. 12A) and a continuous fiber positioned within the notch at the terminal end (FIG. 12B)
Figure 12B:
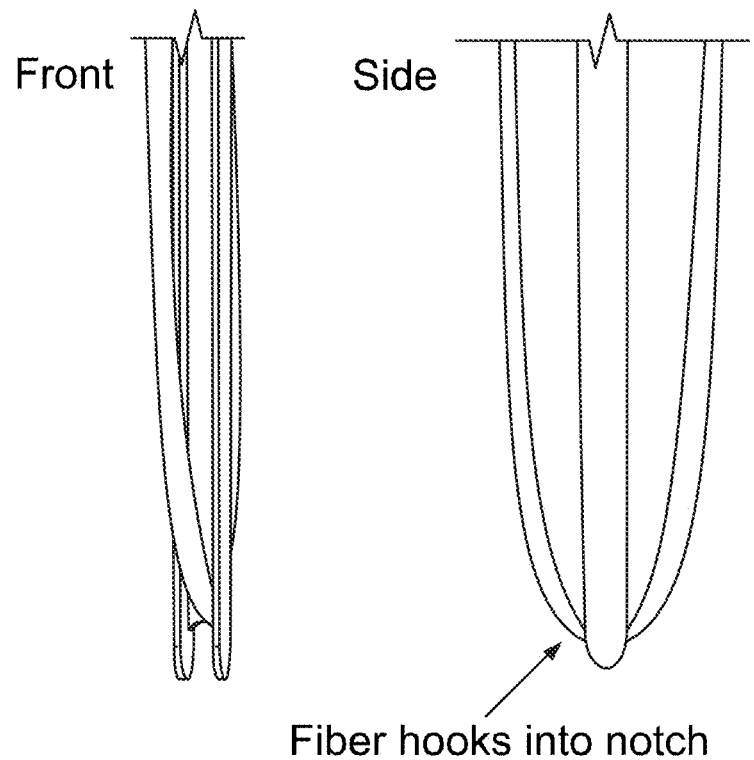
Figure 13:
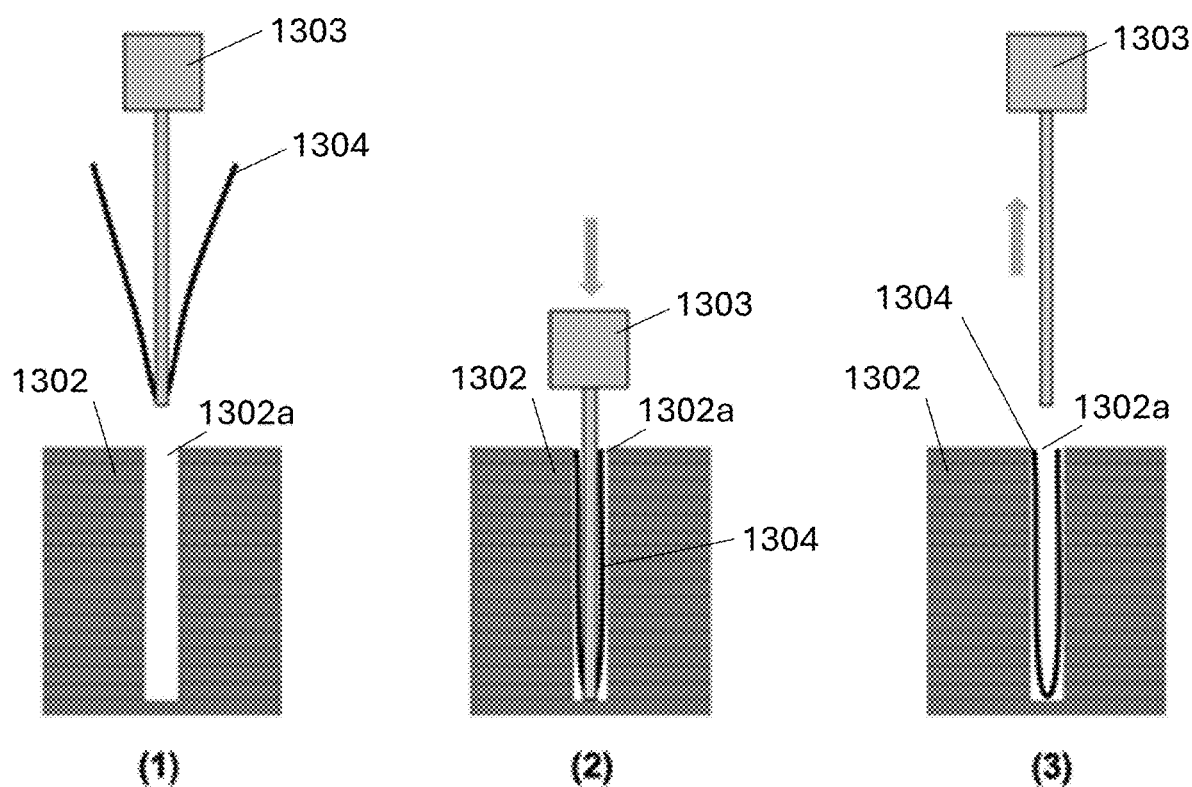
FIG. 13 illustrates a method for inserting a continuous fiber into an open vertical channel using a rod with a grooved concave tip, in accordance with certain embodiments. The grooved concave tip picks up the continuous fiber (1), the combination is inserted in the open vertical channel (2), and the rod is removed to leave the continuous fiber in the open vertical channel (3)

In some embodiments, the continuous fiber can be pushed into an open channel using a rod that has a tip structured to hold the fiber in position. For example, as illustrated in FIGS. 12A, 12B, and 13, a continuous fiber is hooked with a rod having a grooved concave tip that fits the diameter of the continuous fiber. The continuous fiber, when caught by the grooved concave tip of the rod, is doubled up against the sides of the rod and pushed into the open vertical channel. Removal of the rod deposits the continuous fiber in the vertical channel. As further shown in FIGS. 12A, 12B, and 13, the continuous fiber has a diameter that fits within the groove of the rod's grooved concave tip used to insert it into the open vertical channel. For example, as illustrated in FIG. 13, a fiber 1304 can be caught by the concave tip of a lumen 1303 for insertion in a vertical channel 1302*a* of part 1302, e.g., in a manner similar to that illustrated in FIG. 10. This type of insertion is suitable for fibers that have a smaller bend radius and are likely not to break at the groove concave tip. Suitable fibers for insertion using a grooved concave tip include, but are not limited to, raw carbon fiber, carbon fiber impregnated with a thermoset resin that is uncured or partially cured, carbon fiber impregnated with a thermoplastic matrix using a heated syringe, aramid, i.e., KEVLAR®, fibers, fibers impregnated with a ductile and low stiffness polymer matrix, e.g., thermoplastic or thermoset, allowing the fiber tow to bend without breaking. The illustration of channels and fibers having substantially circular cross-sections in FIGS. 12A, 12B, and 13 is only an embodiment and the channels printed within the parts and the fibers themselves can have any suitable cross-sectional shape, e.g., circular, oval, triangular, rectangular, or shaped to match the geometry of the infill or channel in the FFF part.

Figure 14:
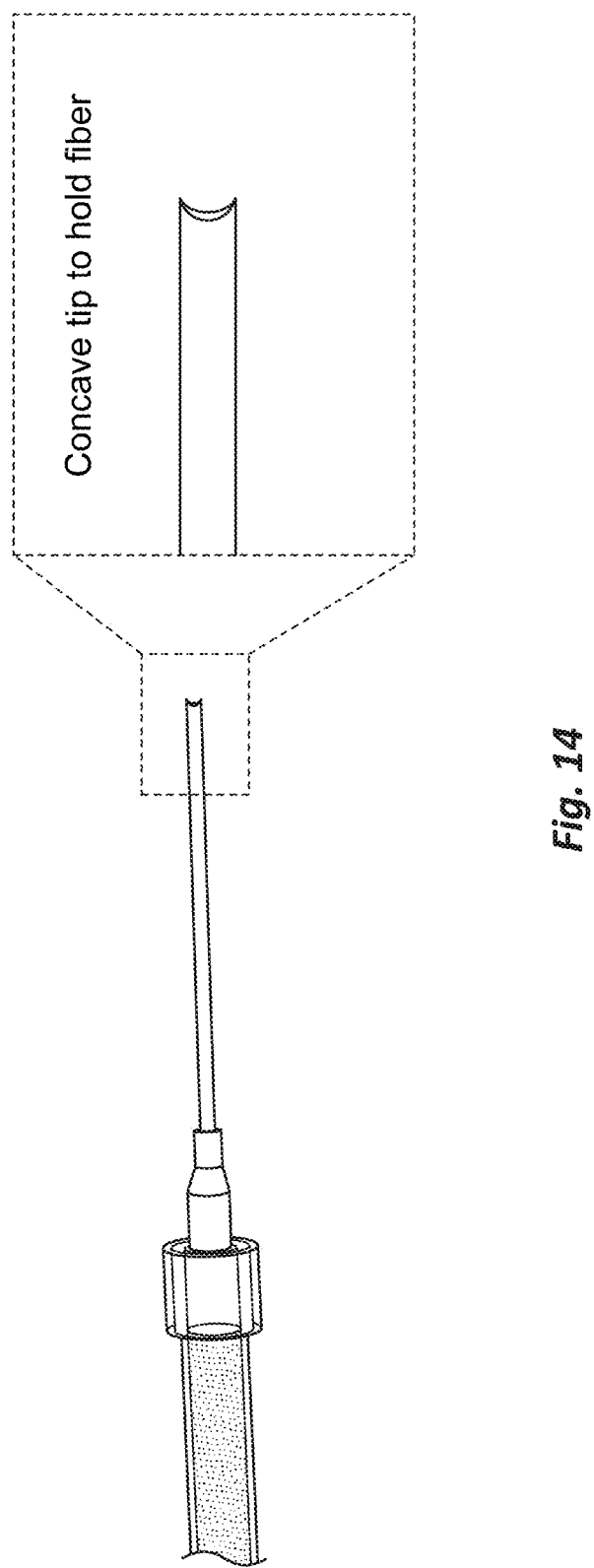
FIG. 14 is a zoomed in image of a grooved concave tip of a needle used to pick up the continuous fiber for insertion into a vertical channel of the part and to allow infiltration of resin from the syringe.
Figure 15:
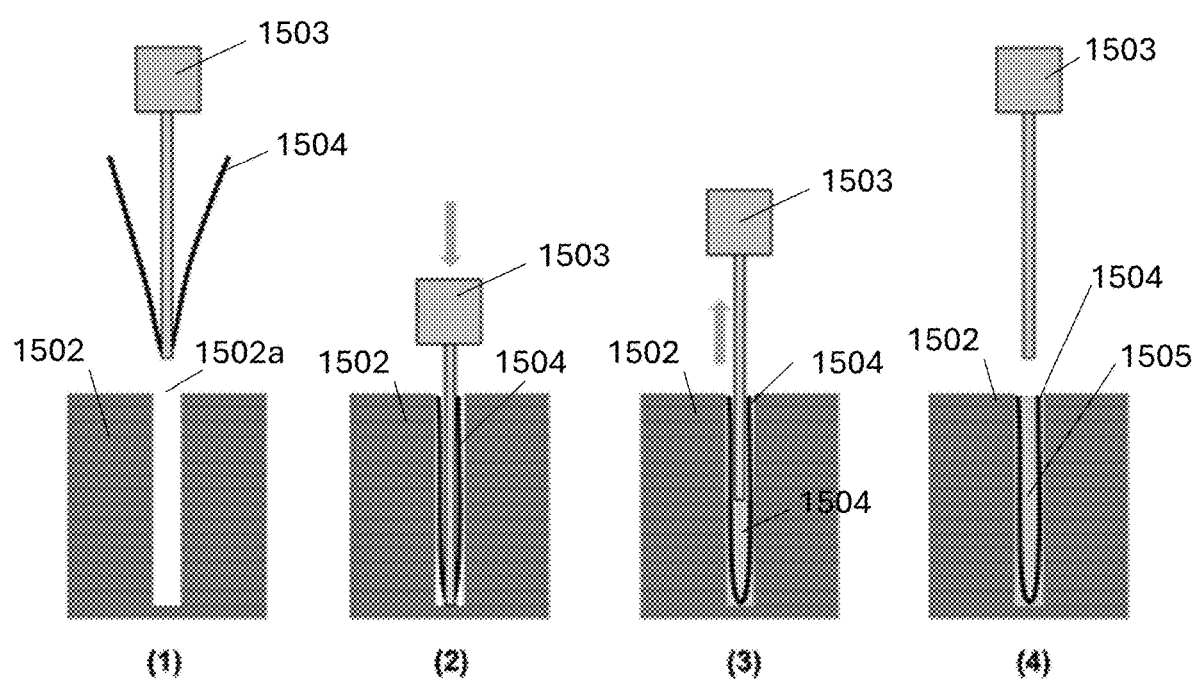
FIG. 15 illustrates a method of inserting a continuous fiber into an open vertical channel using a lumen with a grooved concave tip. The grooved concave tip picks up the continuous fiber (1), the combination is inserted in the open vertical channel (2), and the lumen is removed while infiltrating the channel with resin (3) to leave the continuous fiber and resin in the open vertical channel (4)

In some embodiments, a lumen, e.g., a needle or syringe tip, can be used to insert or push the continuous fiber into an open vertical channel of the part. The user of a lumen, e.g., a needle or syringe tip, permits the infiltration of resin into the open vertical channel as the continuous fiber is placed in the open vertical channel. The infiltration of resin can occur before, during, or after placing continuous fiber into the open vertical channel. An example of a lumen, e.g., a needle or syringe tip, used to insert the continuous fiber into an open vertical channel of the part and infiltrate with resin is illustrated in FIGS. 14 and 15. As seen in FIGS. 14 and 15, the tip of the lumen has a grooved concave tip that is sized to pick up a continuous filament that is resistant to breakage. For example, as illustrated in FIG. 15, the lumen 1503 tip can catch the fiber 1504 and direct it into the vertical channel 1052a of the part 1502. Once the fiber 1504 is positioned, the lumen 1503 allows a resin 1505 to be directed into the vertical channel 1502a of the part 1502 as the lumen 1503 is removed from the vertical channel 1502a to fill the remaining volume and secure the fiber 1504 upon the resin 1505 curing. As described herein with the push rod having a grooved concave tip, this type of insertion is suitable for fibers that have a smaller bend radius and are likely not to break at the groove concave tip. Suitable fibers for insertion using a grooved concave tip include, but are not limited to, raw carbon fiber, carbon fiber impregnated with a thermoset resin that is uncured or partially cured, carbon fiber impregnated with a thermoplastic matrix using a heated syringe, aramid, i.e., KEVLAR®, fibers, fibers impregnated with a ductile and low stiffness polymer matrix, e.g., thermoplastic or thermoset, allowing the fiber tow to bend without breaking. The illustration of channels and fibers having substantially circular cross-sections in FIGS. 14 and 15 is only an embodiment and the channels printed within the parts and the fibers themselves can have any suitable cross-sectional shape, e.g., circular, oval, triangular, rectangular, or shaped to match the geometry of the infill or channel in the FFF part.

Figure 16A:
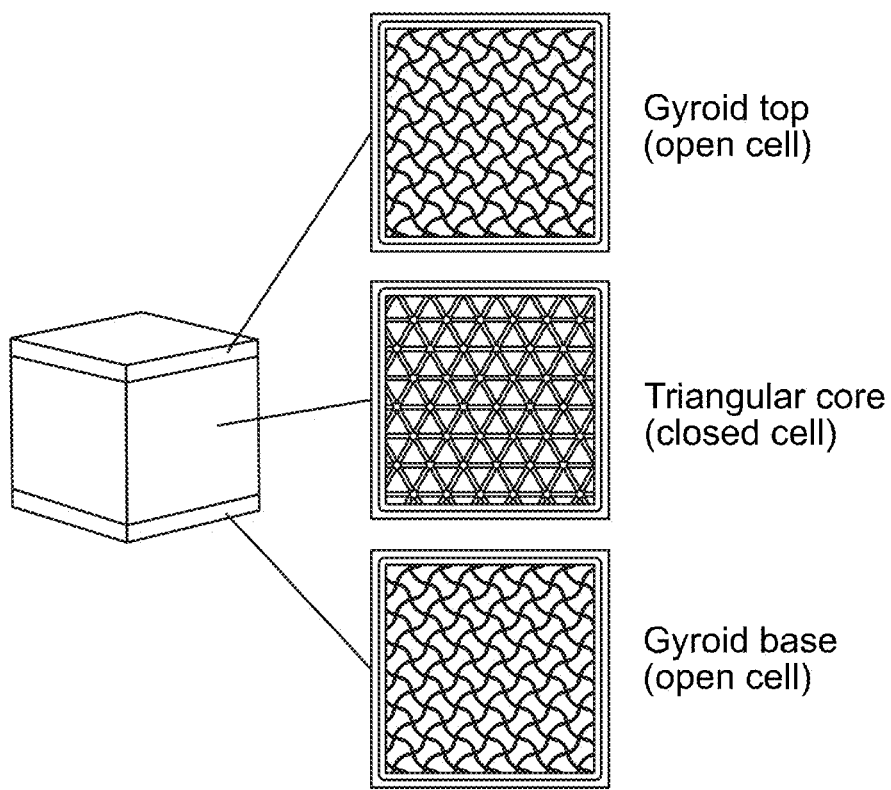
FIGS. 16A-16B illustrate a schematic (FIG. 16A) and an image (FIG. 16B) of a block made with different components having specific infill patterns. As open cell infill in a gyroid pattern was used along the top and bottom of the block to infiltrate the closed cell triangular pattern infill in the center.
Figure 16B:
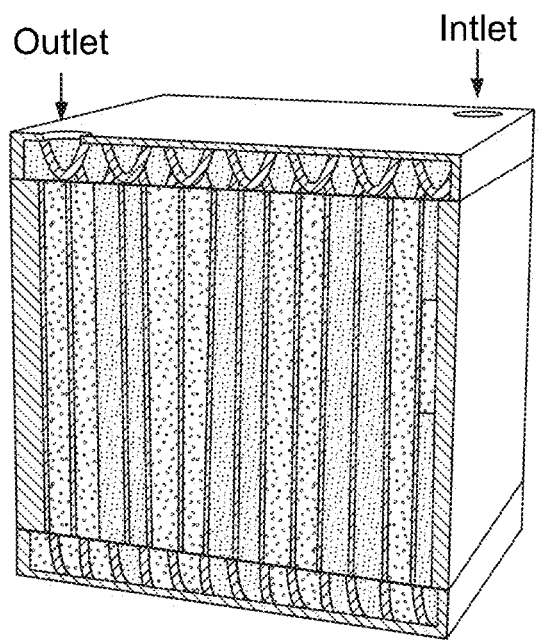

In some embodiments, parts can be printed or produced using one or more different infill patterns. In general, the internal geometry of a part can be open cell infill, combination of open and closed cell infill, a combination of low density and high-density regions created via custom infill, or a solid fill part with interior channels designed to allow resin to flow. In some embodiments, the entirety of the part may be an open cell infill, e.g., gyroid fill or rectangular fill with alternating paths. In other embodiments, a portion of the part may be an open cell infill and a separate portion of the part may have a closed cell infill, e.g., triangular infill. In further embodiments, the entirety of the part may be a closed cell infill. The use of closed cell infill patterns, such as triangular infill, creates exemplary vertical channels that can readily accept fiber reinforcement but are challenging to infiltrate as they are closed cell. One strategy to capture the benefits of triangular or other closed cell infill patterns for fiber placement but has the infiltration case of open cell infill patterns is to print parts having a combination of infill patterns in different layers of the part. For example, a rectangular infill that alternates its raster angle every few layers, i.e., 45°, 45°, 45°, −45°, −45°, −45°, can be used in combination with triangular infill to create an open-cell infill with vertical channels. A second example of using mixed infill patterns is illustrated in FIGS. 16A-16B which shows a cube made from top and bottom layers of a gyroid infill to provide for inlets and outlets for resin infiltration and a core made from closed cell triangular infill to create vertical channels for fiber reinforcement in the Z-direction. As is seen in FIGS. 16A-16B, the top and bottom of the cube were made with a gyroid pattern open infill and included the inlet and outlet. In this example, the resin was able to be introduced into the triangular cells using the open pattern of the gyroid infill, which afforded complete infiltration of the cube with resin.

In some embodiments, parts that are designed to be filled with a resin as disclosed herein are not planar. As is generally known in additive manufacturing, typical 3D printing systems are limited to the formation of planar parts that can be sliced as part of software-based pathing control. The use of planar slicing can limit the applicability of 3D printing for more complex part geometries as well as for parts that would require load-bearing support outside of the X-Y plane vectors. The use of non-planar fiber printing, followed by the infiltration of a non-planar part with a resin, would allow a part to support multi-directional loads, including improvements in Z-axis strength for certain geometries. In some embodiments, a printer constructed and arranged to print non-planar parts may have a print bed that can be adjusted in one or more axes of movement. An example of a multi-axis print bead is illustrated in FIGS. 17A-17B.

Figure 17A:
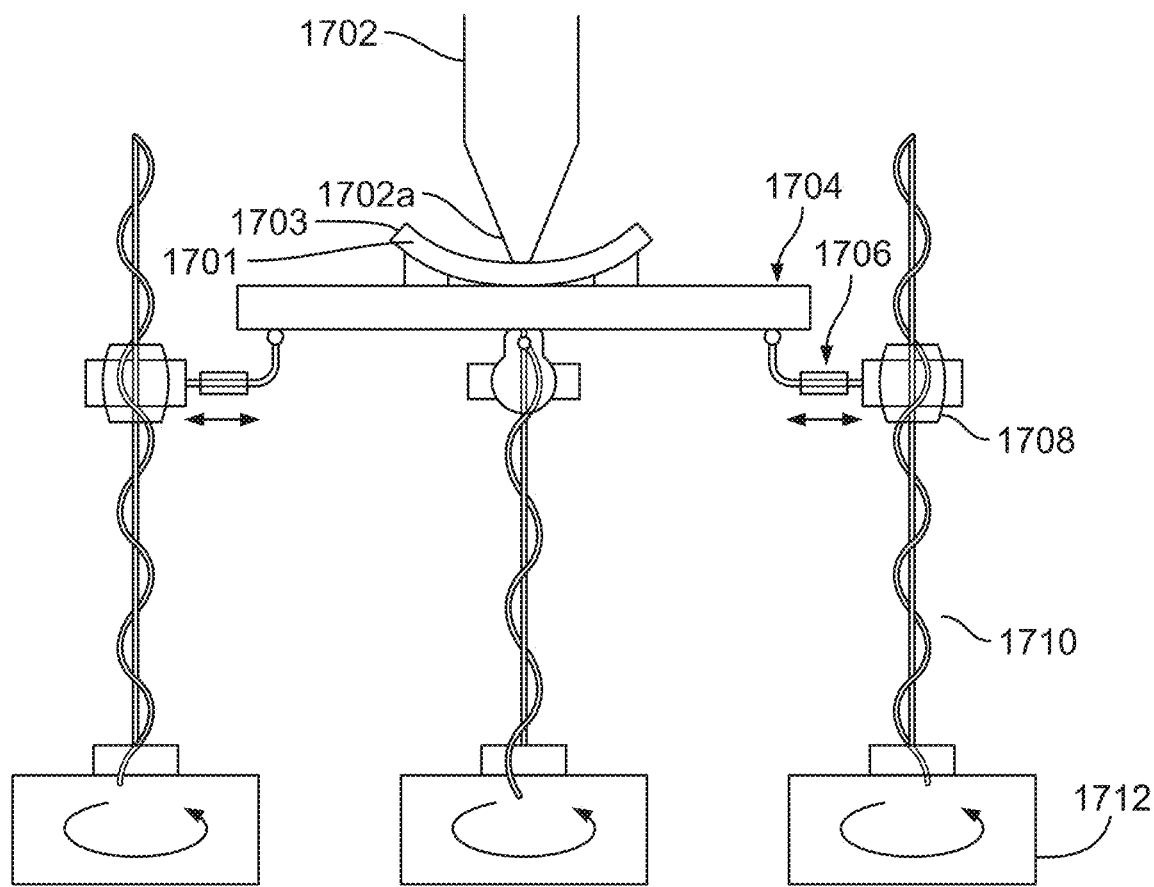
FIGS. 17A-17B illustrate a schematic of a three-dimensional printer having independent angular control of the print head and print bed, in accordance with certain embodiments.
Figure 17B:
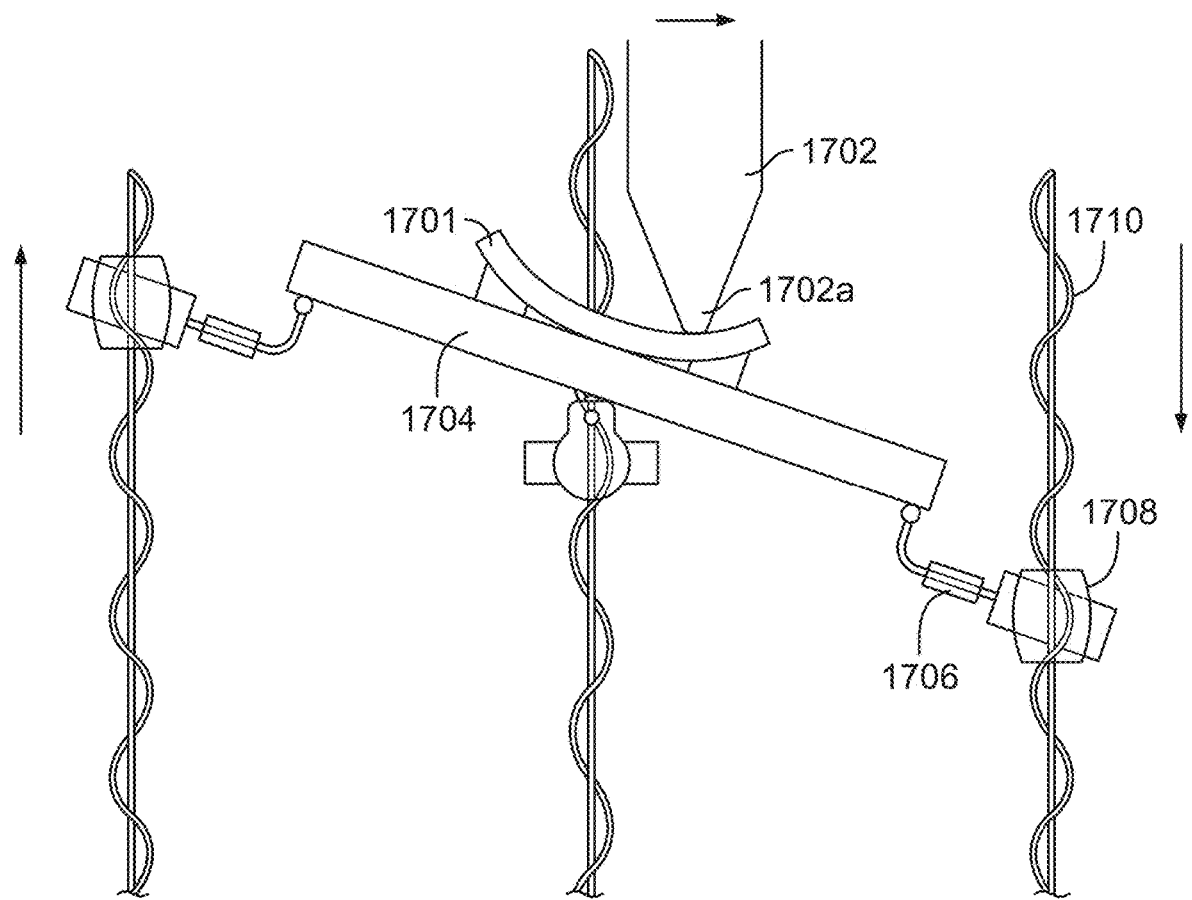

In FIG. 17A, the printer includes a print head 1702 with a needle tip 1702a for depositing fiber 1703 and a print bed 1407 that can hold a curved part 1701. The print bed 1704 includes three mechanical connections, in the form of linear slip joints 1706 and hemispherical joints 1708 along a vertical lead screw 1710, to three motors 1712. Each motor 1712 is independent and can turn the vertical lead screws 1710 to adjust the vertical position of each hemispherical joint 1708 to permit independent angular adjustment in in the X-Y plane of the print bed 1704. Concurrently, the print head 1702 is controllable along the X-, Y-, and Z-axes, thus permitting the printer to have five degrees of freedom for the printing of fiber 1703. The operation of such a five degree of freedom printer is illustrated in FIG. 17B. As illustrated in FIG. 17B, one of the motors 1712 rotated the linear slip joint 1706 and hemispherical joint 1708 to elevate a portion of the print bed 1704 and the other two linear slip joints 1706 and hemispherical joints 1708 independently were lowered to different positions such that the print bed 1704 has an approximately 45-degree angle. The print head 1702 of the printer moves along the direction of the arrow to lay fiber on the curved plastic part 1701, following the curvature of the part 1701. The use of linear slip joints 1706 and hemispherical joints 1708 permits the print bed 1704 to have up to 45 degrees of tilt in both the X and Y axes, independently.

Following printing of a part using the multi axis printing system, the part can have fiber reinforcement and a resin installed therein using the multi axis printing system, e.g., as disclosed herein. The print bed can be adjusted as described herein to move the printed part along any inherent curvature to permit reinforcement fibers and/or resin to be placed where needed or desired.

EXAMPLES

The function and advantages of these and other embodiments can be better understood from the following examples. These examples are intended to be illustrative in nature and are not considered to be in any way limiting the scope of the invention. Table 1 below provides example parts that were made using FFF printing and resin infiltration as disclosed herein.

TABLE 1

Example parts printed using methods disclosed herein and resultant data.

Figure 18A:
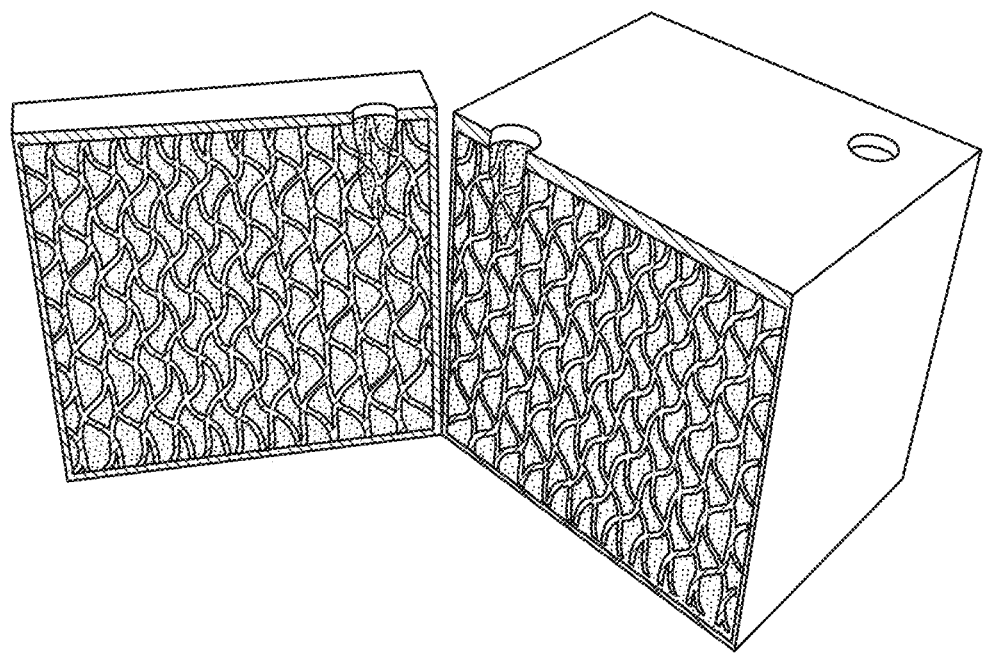
FIGS. 18A-18B illustrate a part printed with two different types of infill showing complete infiltration of the part by a thermoset resin.
Figure 18B:
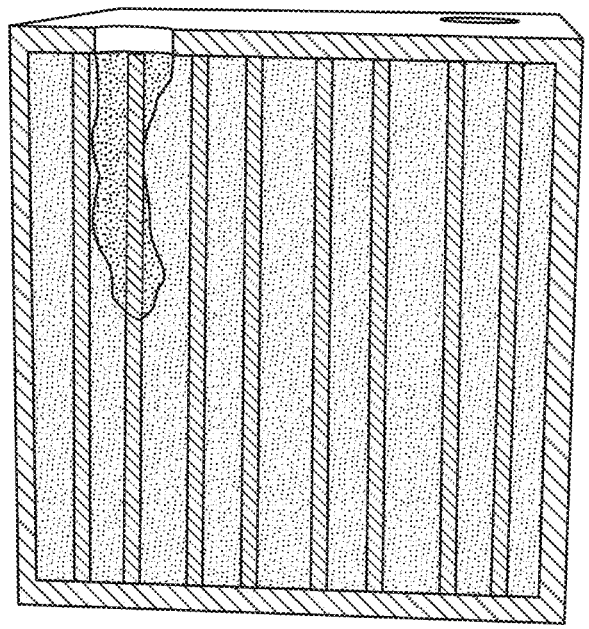
Figure 19A:
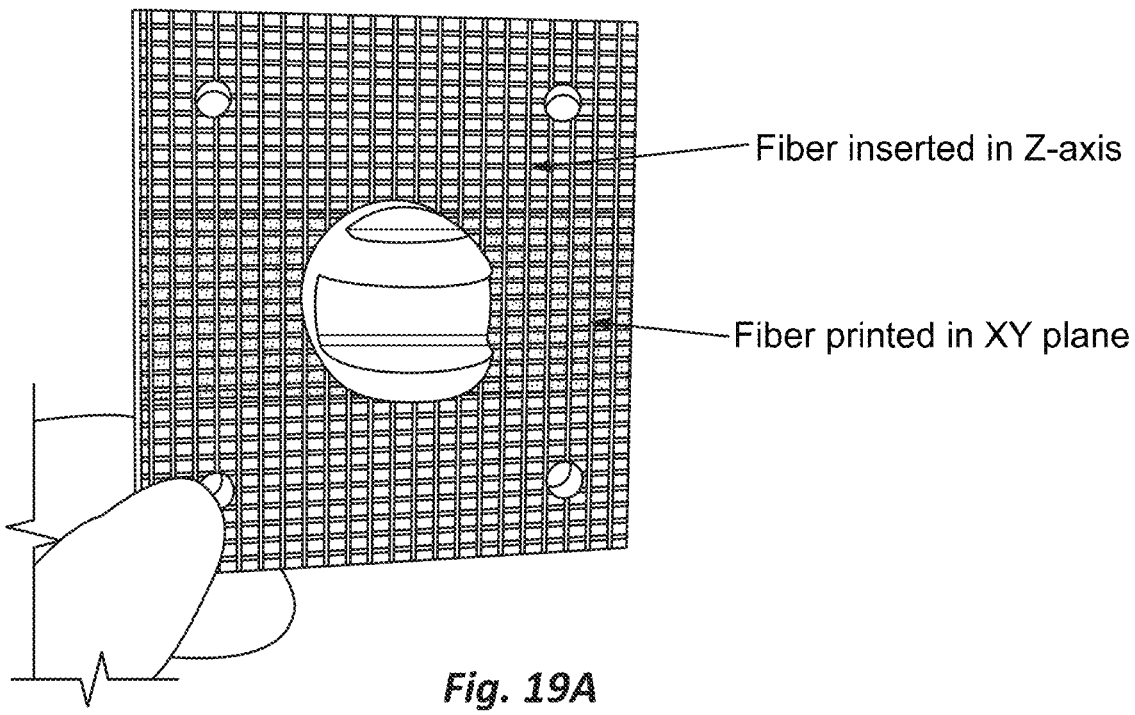
FIGS. 19A-19B illustrate a mounting plate with fiber printed in the X-Y plane and fiber inserted into the Z-axis.
Figure 19B:
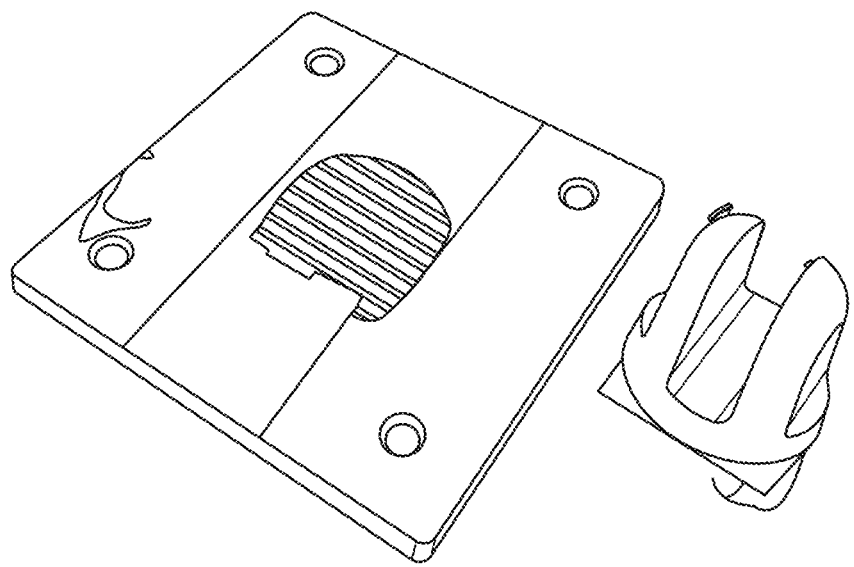

| Description | Representative FIG. |
| --- | --- |
| Infill blocks with open cell infill (gyroid and rectangular infill) that show full infiltration with a thermoset resin. | FIGS. 18A-18B |
| Mounting plate with fiber printed in XY plane and fiber inserted into the Z-axis. This part has an open-cell rectangular infill with fiber inserted in the z-axis. | FIGS. 19A-19B |

TABLE 1-continued

Example parts printed using methods disclosed herein and resultant data.

Figure 20A:
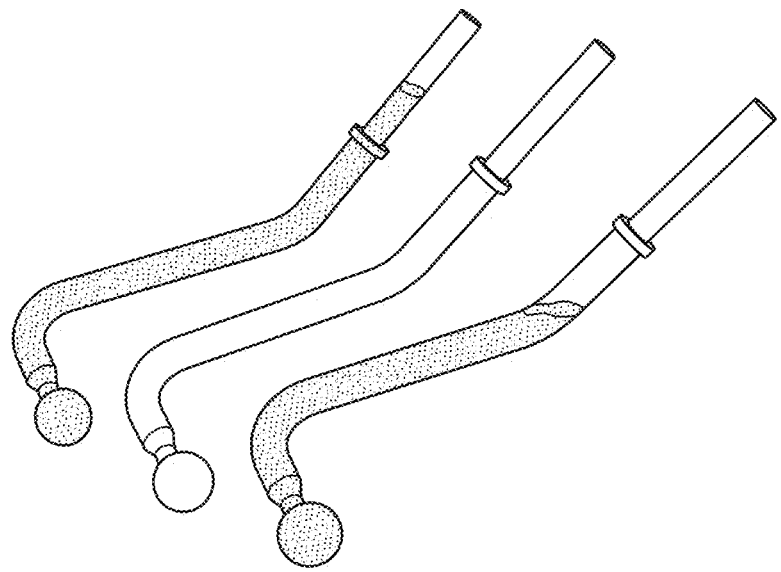
FIGS. 20A-20B illustrate a part designed as a mirror holder printed in fiber and infiltrated with a resin.
Figure 20B:
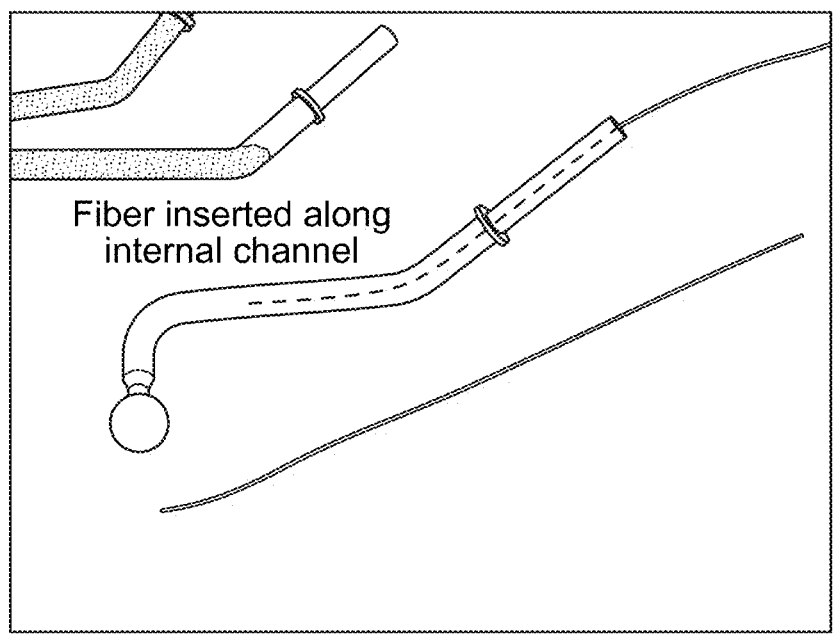
Figure 21A:
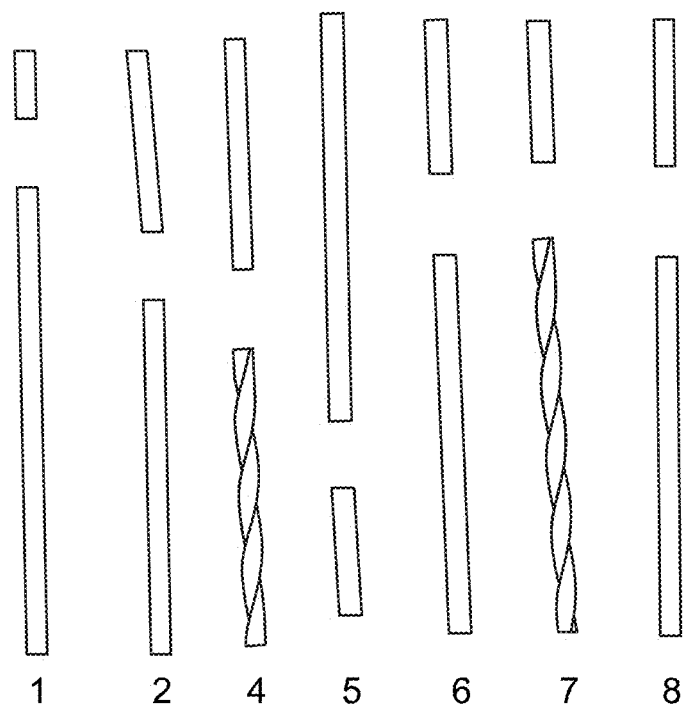
FIGS. 21A-21B illustrate Z-axis tensile testing of parts made from a hollow tube of carbon fiber filled with a thermoset resin and reinforcing fibers.
Figure 21B:
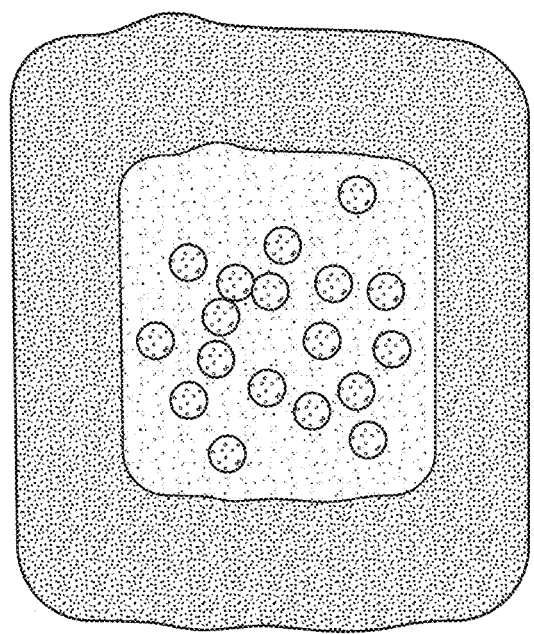
Figure 22:
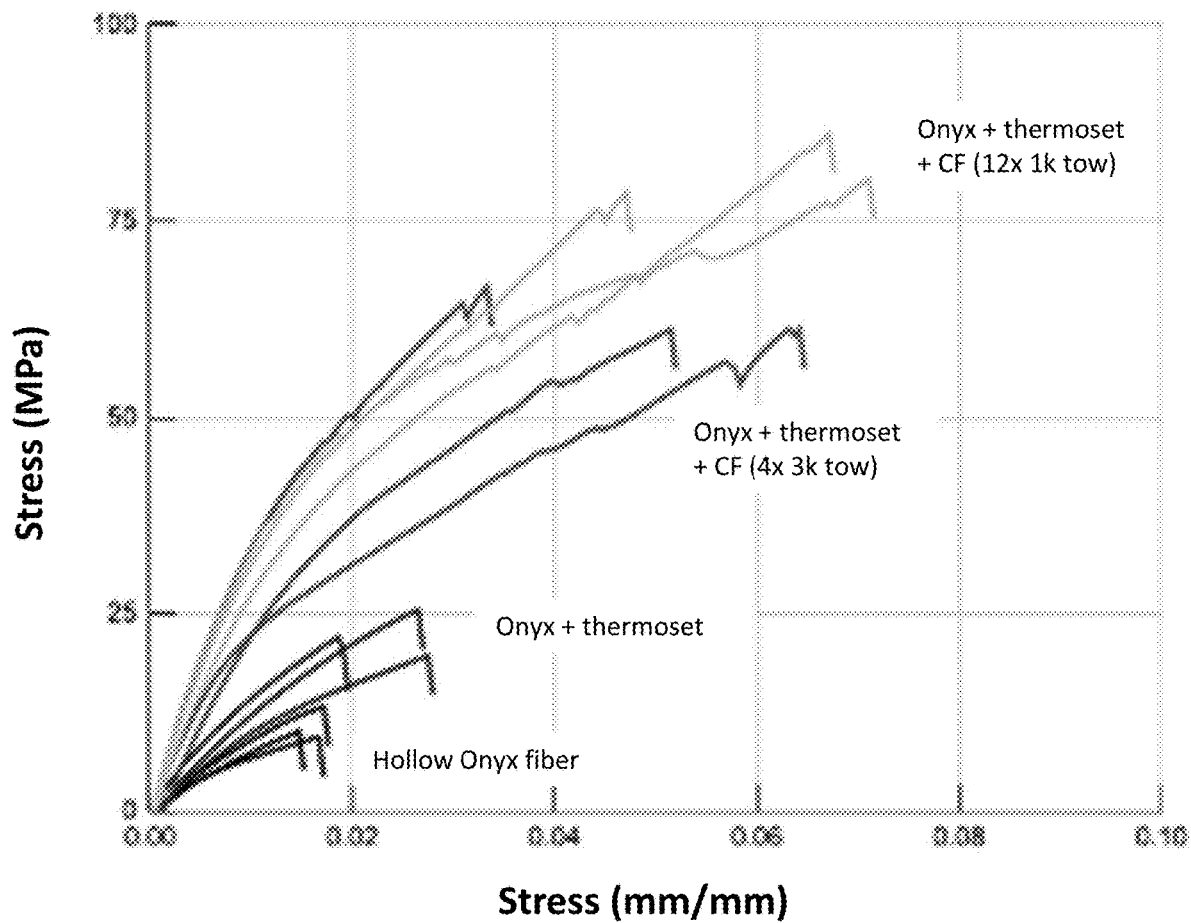
FIG. 22 illustrates tensile strength test results for the test parts illustrated in FIGS. 21A-21B that were infiltrated with a thermoplastic resin.
Figure 23:
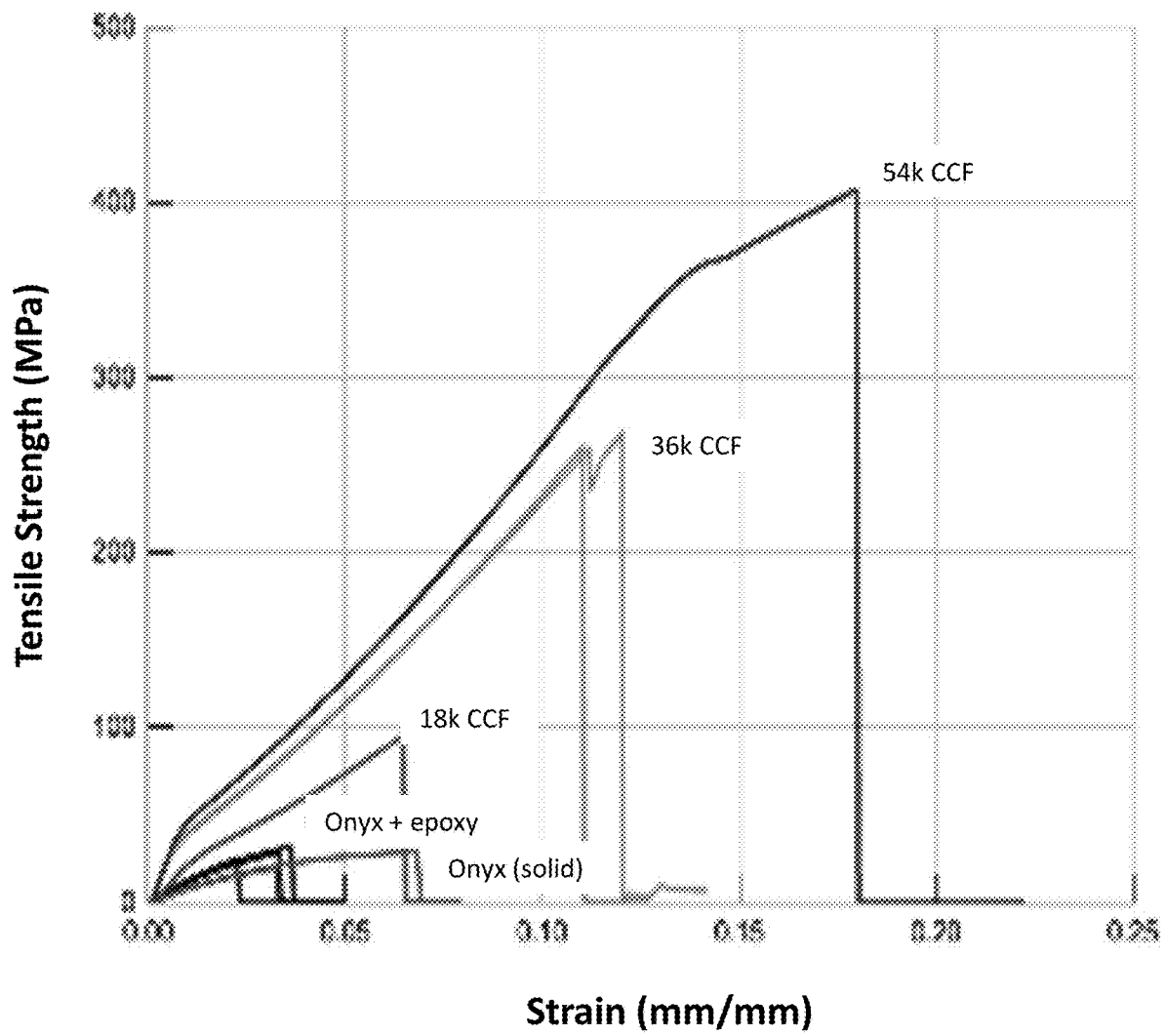
FIG. 23 illustrates tensile strength test results for the test parts illustrated in FIGS. 21A-21B that were infiltrated with a thermoset resin.
Figure 24:
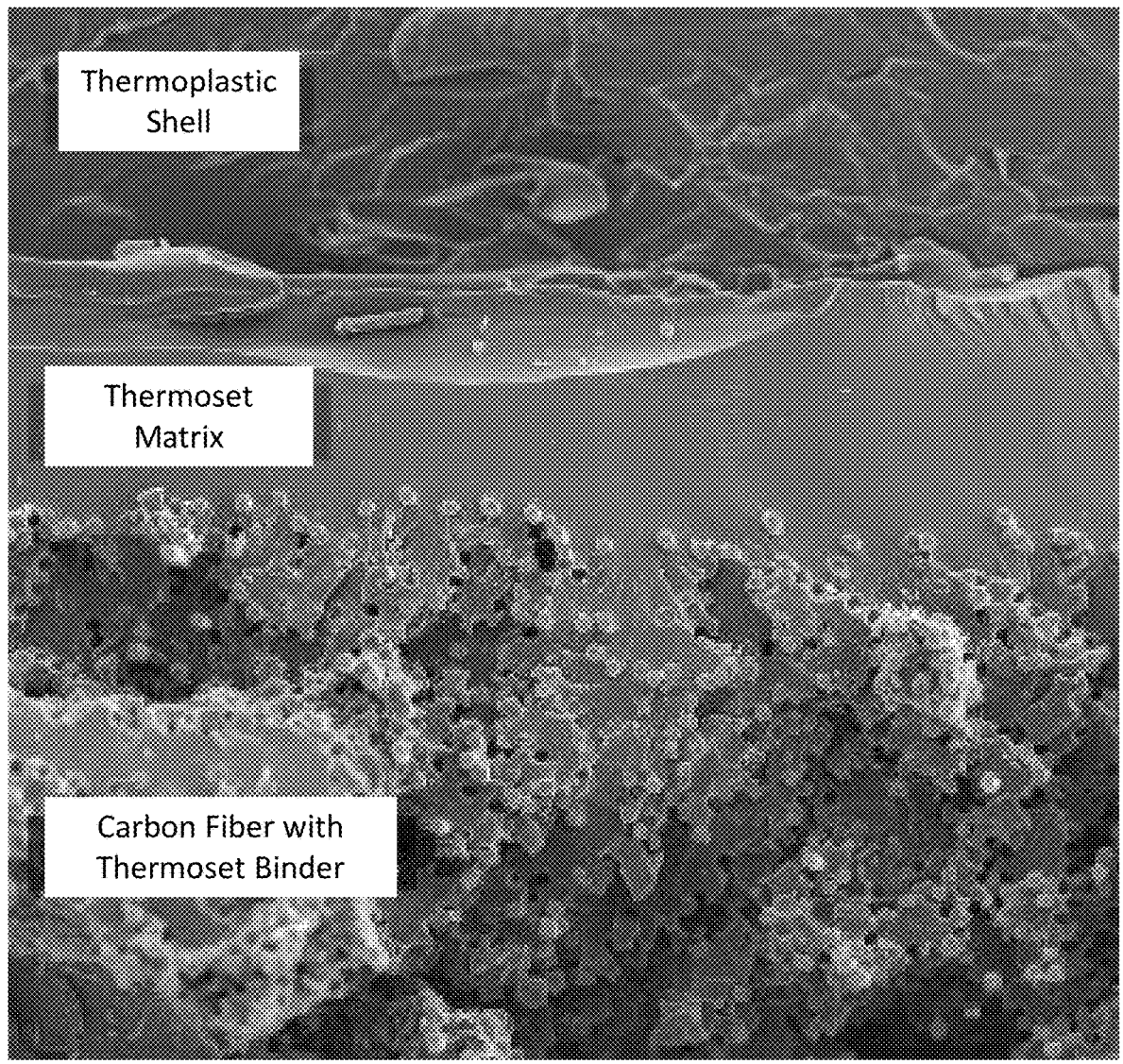
FIG. 24 illustrates scanning electron microscopy images of test parts illustrated in FIGS. 21A-21B post-fracturing.

| Description | Representative FIG. |
|---|---|
| This part was printed with a transparent nylon to observe the fiber in both directions. | |
| The same mounting plate that was infiltrated with resin and mechanical properties tested. Fracture surface shows internal fiber reinforcement. | |
| Mirror holder printed using an open cell infill that was infiltrated with resin. | FIGS. 20A-20B |
| Two additional mirror holders designed with and without fiber printed in the X-Y plane. Both parts have an internal channel to place fiber and reinforce the bend with the internal channel indicated by the dotted red line in second image. | FIGS. 21A-21B |
| Unit test fiber Z-strength samples Unit tests were made from a hollow tower made from a continuous carbon fiber-nylon composite filament printed in the Z-axis. The center of the tower is hollow to insert Z-axis fibers and to permit infiltration with a thermoset resin. | |
| Tensile test results of unit test samples above with thermoplastic and thermoset impregnated continuous fiber. | FIGS. 22 and 23 |
| Scanning electron microscopy of unit test fracture samples above showing excellent adhesion between thermoset impregnated fiber, infiltrated thermoset, and thermoplastic FFF skeleton. | FIG. 24 |

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of infiltrating a three-dimensional part with a resin, comprising:
   designing a part to be printed, the part having an inlet and infill patterns comprising one or more of a triangular infill, a hexagonal infill, a rectangular infill, and a gyroid infill, wherein the infill patterns further comprise surface patterning features extending along at least one channel thereof in a Z-direction of the part;
   using three-dimensional printing to print the designed part;
   infiltrating the printed part using a resin delivered to an interior of the part via the inlet to surround the infill patterns with the resin; and
   allowing the infiltrated resin to cure.

2. The method of claim 1, further comprising pausing the printing of the part prior to infiltrating with the resin.

3. The method of claim 1, further comprising inserting one or more Z-direction reinforcement layers into the part.

4. The method of claim 3, wherein the one or more Z-direction reinforcement layers comprises a filament or fiber.

5. The method of claim 4, wherein the filament or fiber comprises one or more of raw carbon fiber, carbon fiber impregnated with a thermoset resin, carbon fiber impregnated with a thermoplastic matrix, aramid fibers, and fibers impregnated with a polymer.

6. The method of claim 5, wherein the insertion of the one or more Z-direction reinforcement layers into the part takes place while the printing of the part is paused, further comprising resuming the printing of the part following the insertion of the one or more Z-direction reinforcement layers.

7. The method of claim 1, wherein the resin is a thermoset resin or a thermoplastic resin.

8. The method of claim 7, wherein the thermoset resin is one or more of epoxies, phenolic resins, UV curing resins, polyesters, vinylesters, polyamide resins, bismaleimide resins, rubbers, and mixtures thereof.

9. The method of claim 7, wherein the thermoplastic resin is one or more of acrylonitrile butadiene styrene (ABS), acrylic, high density polyethylene (HDPE), polypropylene, polyethylene, polystyrene, polyvinylchloride (PVC), styrene, polycarbonate, nylon, acetal, and poly(tetrafluoroethylene) (FTFE).

10. The method of claim 1, wherein the resin has a viscosity between about 1,500 cP to 15,000 cP during the infiltration.

11. The method of claim 1, wherein the resin is neat.

12. The method of claim 1, wherein the resin comprises one or more additives.

13. The method of claim 12, wherein the one or more additives include carbon fibers, glass, ceramics, metals, minerals, or mixtures thereof.

14. The method of claim 12, wherein the one or more additives are in the form of rods, fibers, cones, tubes, platelets, spheres, or mixtures thereof.

15. The method of claim 1, wherein the resin provides for the part with less than 0.2% linear shrinkage in a linear dimension upon said curing of the resin.

16. The method of claim 1, wherein the surface patterning features of the infill patterns comprise one or more of undulating surfaces, triangular patterns, hexagonal patterns, offset infill patterns, or variable width channels.

17. The method of claim 1, wherein the infiltrating of the part with resin occurs on a multi-axis print bed with five degrees of freedom.

18. The method of claim 1, wherein the inlet is one of a plurality of inlets of the part.

19. A method of infiltrating a three-dimensional part with a resin, comprising:
- using three-dimensional printing to print a designed part having reinforcement in an X-Y plane and infill patterns comprising one or more of a triangular infill, a hexagonal infill, a rectangular infill, and a gyroid infill, wherein the infill patterns further comprise surface patterning features extending along at least one channel thereof in a Z-direction of the part;
- printing continuous reinforcement in a Z-direction across one or more layers of the part;
- printing a final layer including an inlet and an outlet of the part;
- infiltrating the printed part using a resin delivered to an interior of the part via the inlet to surround the reinforcement in the X-Y plane, the continuous reinforcement in the Z-direction, and the infill patterns with the resin; and
- allowing the infiltrated resin to cure.

20. The method of claim 19, wherein the inlet is one of the plurality of inlets of the part, and wherein the outlet of one of a plurality of outlets of the part.

* * * * *